United States Patent [19]
Sasaki et al.

[11] Patent Number: 5,895,002
[45] Date of Patent: Apr. 20, 1999

[54] WEBBING RETRACTOR

[75] Inventors: Sumikazu Sasaki; Seiji Hori; Yasuho Kitazawa, all of Aichi-ken, Japan

[73] Assignee: Kabushiki Kaisha Tokai-Rika-Denki-Seisakusho, Aichi-ken, Japan

[21] Appl. No.: 09/021,821

[22] Filed: Feb. 11, 1998

[30] Foreign Application Priority Data

Feb. 17, 1997 [JP] Japan ................... 9-032434
Nov. 14, 1997 [JP] Japan ................... 9-313897

[51] Int. Cl.⁶ ............................................. B60R 22/28
[52] U.S. Cl. .............................................. 242/374
[58] Field of Search ........................... 242/374, 379.1; 280/805, 806, 807

[56] References Cited

U.S. PATENT DOCUMENTS

| | | | |
|---|---|---|---|
| 5,344,095 | 9/1994 | Frei | 242/374 |
| 5,443,222 | 8/1995 | Modinger et al. | 242/374 |
| 5,522,564 | 6/1996 | Schmidt et al. | 242/374 |
| 5,624,083 | 4/1997 | Modinger et al. | 242/374 |
| 5,628,469 | 5/1997 | Fohl | 242/374 |
| 5,738,293 | 4/1998 | Fohl | 242/374 |

FOREIGN PATENT DOCUMENTS 4-92748  3/1992  Japan.
7-47923  2/1995  Japan.

Primary Examiner—John P. Darling
Attorney, Agent, or Firm—Sixbey Friedman Leedom & Ferguson; Thomas W. Cole

[57] ABSTRACT

A webbing retractor comprises a spool around which a webbing capable of being unwound therefrom is wound; a pretensioner for rotating said spool in a webbing winding direction when a deceleration of a predetermined value or more is applied during a sudden deceleration of a vehicle; an energy absorbing member put in a coupled state with said spool, rotated integrally with said spool and deformed by said spool to prevent an increase in tension of the webbing when rotational force in a webbing unwinding direction acts upon said spool after said spool has been rotated in said webbing winding direction by said pretensioner; and a cancelling portion applied with the rotational force in said webbing unwinding direction via said energy absorbing member when the energy absorbing member is deformed by the rotational force in said webbing unwinding direction, for cancelling the state in which rotation of said spool in the webbing unwinding direction is stopped by said pretensioner. Therefore, after the spool is rotated in the webbing winding direction by the pretensioner, the spool is rotatable in the webbing unwinding direction.

17 Claims, 26 Drawing Sheets

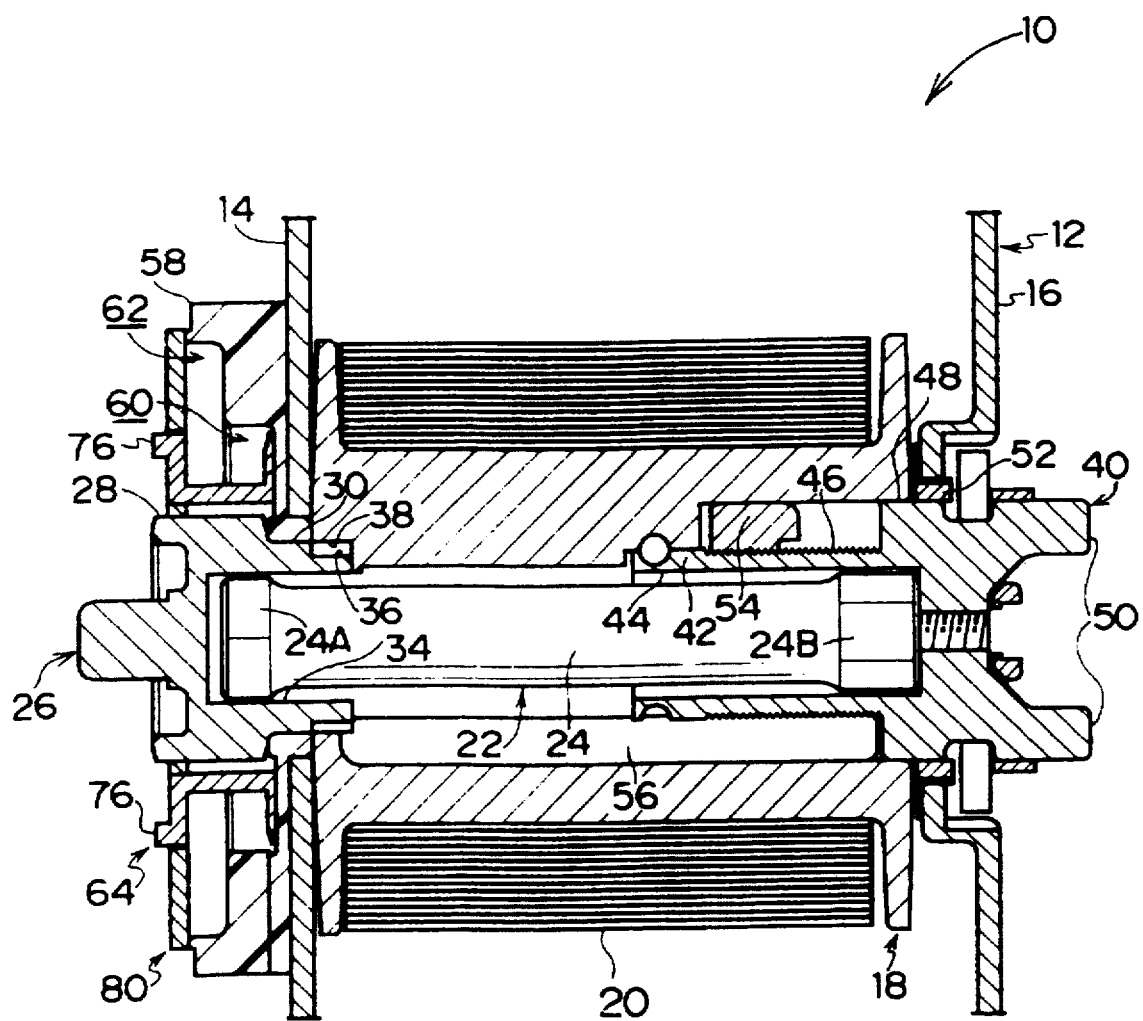
F I G. 2

F I G. 1 3
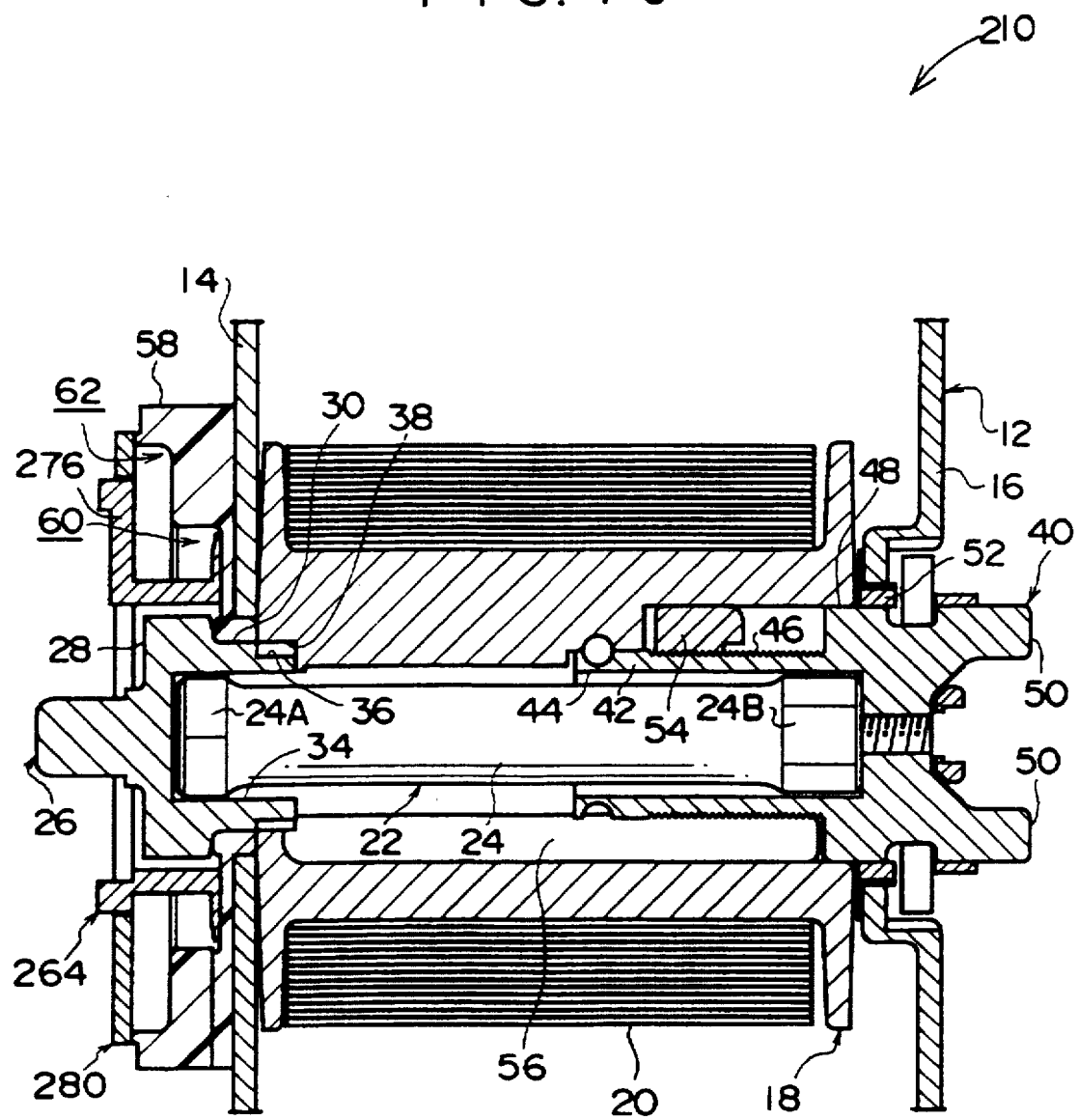

F I G. 23A
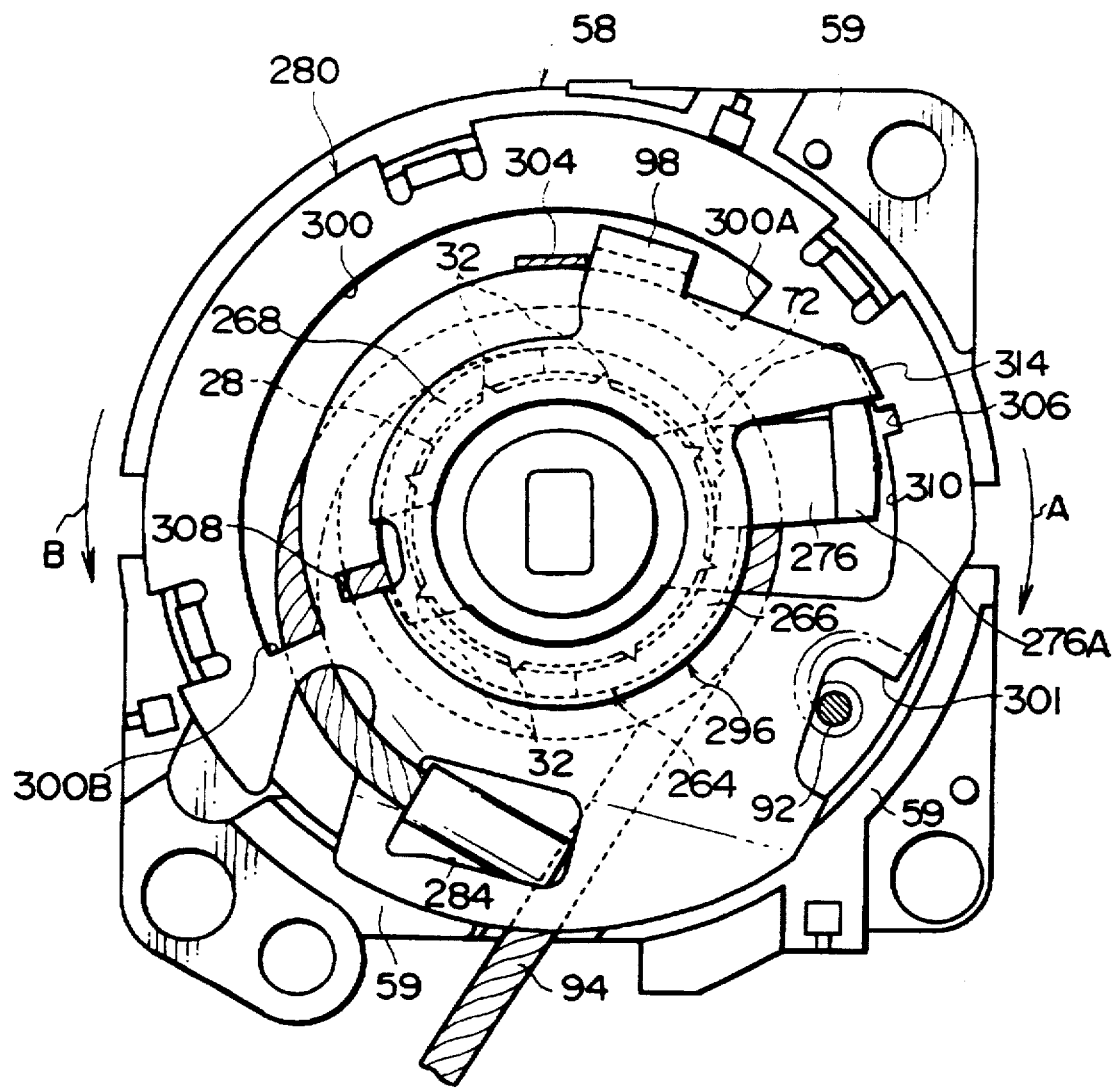
F I G. 23B
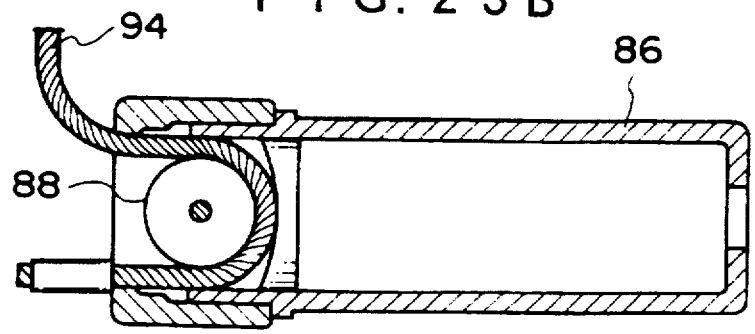

WEBBING RETRACTOR

BACKGROUND OF THE INVENTION

1. Field of the Invention

The present invention relates to a webbing retractor provided with a pretensioner tensing a webbing at the time of a sudden or rapid deceleration of a vehicle and a force limiter preventing a tension of a predetermined value or more from being applied to the webbing.

2. Description of the Related Art

There is a webbing retractor installed into a vehicle provided with a pretensioner for winding and tensioning a webbing when the deceleration of a predetermined value or more occurs to the vehicle and giving constraints to an occupant of a vehicle (see Japanese Patent Application Laid-Open No. 4-92748). FIG. 26 shows a webbing retractor 500 provided with the above-stated pretensioner.

In the webbing retractor 500, a cylindrical spool 506 around which a webbing 504 is wound is rotatably supported by a frame 502.

A pretension shaft 508 integrally provided on one end of the spool 506 is inserted with play into a drum 510. A drum 510 is molded to be generally cylindrical as a whole such that two generally semi-annular clamping portions 512 are connected through a generally S-curved connection portion 514. An intermediate portion of a wire 518 whose one end is connected to a drive plate 516 is wound around the outer periphery of the drum 510. An insertion hole 520, into which the drum 510 is inserted, is formed at the center of the drive plate 516. An engagement part 522 protruding from the drum 510 is housed in a wider diameter portion 520A formed in the insertion hole 520, whereby the engagement part 522 is rotated integrally with the drum 510.

The other end of the wire 518 is connected to a piston (not shown) within a cylinder 524. When the deceleration of the vehicle becomes a predetermined value or more, a gas generator operates and the piston is rapidly pulled into the cylinder 524.

The other end of the spool 506 is provided with a locking part (not shown). If a deceleration of a predetermined value or more is detected, then the locking part locks the rotation of the spool 506 in the direction of unwinding the webbing 504 and allows the spool 506 only to be rotated in the winding direction of the webbing 504.

Thus, when a deceleration of a predetermined value or more occurs in the vehicle, the wire 518 is pulled. Due to this, the wire 518 is tightly wound on the drum 510, the connection part 514 is deformed and the clamping portions 512 become closer to the connection portion 514. The clamping portions 512 clamp the pretension shaft 508 and the drum 510 becomes integral with the spool 506. If the wire 518 is further pulled, the spool 506 is rotated by the resultant tension and thus the webbing 504 is wound on the spool 506.

Meanwhile, there has been proposed a webbing retractor provided with a force limiter preventing the tension applied to the webbing from exceeding a predetermined value.

In a webbing retractor provided with a so-called torsion bar type force limiter (see Japanese Patent Application Laid-Open No. 7-47923), a circular torsion bar torsion-deformable in the circumferential direction is inserted into the cylindrical spool in a coaxial manner with the spool. One end of the torsion bar is fixed to the spool. When the vehicle is suddenly decelerated, the other end of the torsion bar is locked by a locking mechanism. Due to the fixation of one end of the torsion bar to the spool, if tension in the unwinding direction acts upon the webbing at the time of a the deceleration of the vehicle, then the torsion bar is torsionally deformed to rotate the spool, thereby preventing the tension load of a predetermined value or more from being applied to the webbing.

In the meantime, the webbing retractor 500 has a structure that at the time of a sudden deceleration of the vehicle, the drum 510 is tightly wound by the wire 518, the clamping parts 512 clamp the pretension shaft 508 and the drum 510 is rotated together with the spool 506. Due to this, while the wire 318 is unwound to a maximum, the tension acting on the wire 518 prevents the spool 506 from being further rotated in the unwinding direction of the webbing 504. Accordingly, it is impossible to sufficiently torsion-deform the torsion bar in the webbing reactor 500 in which the above-stated force limiter is merely installed.

SUMMARY OF THE INVENTION

Considering the above-stated facts, it is therefore an object of the present invention to provide a webbing retractor capable of, after rotating a spool once in the webbing winding direction by a pretensioner at the time of a sudden deceleration, rotating the spool in the webbing unwinding direction and preventing the tension applied to the webbing by an energy absorbing member from exceeding a predetermined value.

A first aspect according to the present invention is a webbing retractor comprising:

- a spool around which a webbing capable of being unwound therefrom is wound;
- a pretensioner for rotating the spool in a webbing winding direction when a deceleration of a predetermined value or more is applied to a vehicle during a sudden deceleration of the vehicle;
- an energy absorbing member put in a coupled state with the spool to be rotated integrally with the spool and deformed by the spool to prevent an increase in tension of the webbing when rotational force in a webbing unwinding direction acts upon the spool after the spool has been rotated in the webbing winding direction by the pretensioner; and
- a cancelling portion applied with the rotational force in the webbing unwinding direction via the energy absorbing member when the energy absorbing member is deformed by the rotational force in the webbing unwinding direction, for cancelling the state in which rotation of the spool in the webbing unwinding direction is stopped by the pretensioner.

In the webbing retractor in the first aspect, the pretensioner does not constrain the spool while the vehicle is running in an ordinary situation since a deceleration of a predetermined value or more is not applied to the vehicle.

When a deceleration of the predetermined value or more is applied to the vehicle, the pretensioner and the spool are coupled to each other and rotated together, and the webbing is wound around the spool, whereby the webbing tightly constraints an occupant of the vehicle fitted with the webbing.

Next, when the webbing is pulled in the unwinding direction in the state in which the rotation of the spool in the unwinding direction is stopped, the tension is transmitted to the energy absorbing member from the spool. The energy absorption such as the deformation of the energy absorbing member functions as a allows the force limiter which prevents the force applied to the occupant from exceeding a predetermined value. When the webbing is further pulled against the function of the force limiter, the tension acts upon the cancelling portion. If the tension exceeds a predetermined value, the cancelling portion cancels the state in which the rotation of the spool in the webbing unwinding direction is stopped by the pretensioner. In other words, the spool is made rotatable relative to the pretensioner. Therefore, in this state, energy absorption is further continued and so functions as the operation of the force limiter. As a result, the force applied to the occupant is prevented from exceeding the predetermined value.

It is to be noted that the cancelling portion may be freely selected from among those capable of rotating the spool relative to the pretensioner. They include, for example, a plastically deformable member, an elastically deformable member, a member to be broken, a clutch, a friction plate and the like.

In the second aspect according to the present invention, the cancelling portion is a portion to be broken which is broken to thereby separate the spool, that is, the energy absorbing member or means and the pretensioner in the first aspect stated above.

In the second aspect, since the portion to be broken is broken and the spool is separated from the pretensioner, the spool becomes freely rotatable relative to the pretensioner.

The third aspect according to the present invention is a webbing retractor comprising:

a spool around which a webbing capable of being unwound therefrom is wound;

an energy absorbing member rotated integrally with the spool and deformed if torsion of a predetermined value or more is applied to the energy absorbing member;

a pretensioner comprising:

a rotation member rotated in the webbing winding direction when a deceleration of a predetermined value or more is applied to a vehicle during a rapid deceleration of the vehicle;

a coupling member rotatable integrally with the rotation member and coupled to the energy absorbing member to rotate the energy absorbing member in the webbing winding direction when the deceleration of the predetermined value or more is applied to the vehicle; and an engagement portion protruding from the coupling member, rotated in the webbing winding direction together with the coupling member after a vicinity of a proximal of the engagement portion is pressed by the rotation member when the rotation member is rotated in the webbing winding direction, and having a tip end portion of the engagement portion is pressed when the coupling member is rotated in response to rotational force of the spool in the webbing unwinding direction via the energy absorbing member; and a cancelling portion for cancelling the state in which the rotation of the spool in the webbing unwinding direction is stopped by the pretensioner when the energy absorbing member is deformed by a torsion of the predetermined value or more due to the rotational force in the webbing unwinding direction and the tip end portion of the engagement portion is pressed by the rotation member.

In the webbing retractor in the third aspect, the pretensioner does not constraint the spool while the vehicle is running in a normal state since a deceleration of the predetermined value or more dose not act upon the vehicle runs.

When a deceleration of a predetermined value or more is applied to the vehicle, the rotation member is rotated in the webbing winding direction. In addition, the coupling member is coupled to the spool. As a result, the rotation of the rotation member is transmitted to the spool via the coupling member from the engagement portion, and the webbing is wound on the spool. Therefore, the webbing tightly constraints the occupant fitted with the webbing.

Next, when the webbing is pulled in the unwinding direction in the state in which the rotation of the spool in the webbing unwinding direction is stopped by the pretensioner, the tension, that is, the torsion is transmitted to the energy absorbing member from the spool. When the torsion has the predetermined value or more, the energy absorption such as the deformation of the energy absorbing member function as a force limiter which prevents the force applied to the occupant from exceeding a predetermined value. When the webbing is further pulled against the function of the force limiter and the coupling member is rotated in response to the rotational force of the spool in the webbing unwinding direction, the tip end portion of the engagement portion is pressed by the rotation member. The larger bending moment (than the bending moment applied in case that the vicinity of the proximal portion of the engagement portion is pressed by the rotation member) acts upon the engagement portion. The cancelling portion is applied with the rotational force in the webbing unwinding direction and cancelling the state in which the rotation of the spool in the webbing unwinding direction is stopped by the pretensioner. Due to this, the spool becomes rotatable relative to the pretensioner. Therefore, in this state, energy absorption is further continued and the cancellation acts as the another force limiter. As a result, the force applied to the occupant is prevented from exceeding the predetermined value.

When the energy absorbing member is deformed by the rotational force in the webbing unwinding direction as stated above, the tip end portion rather than the vicinity of the proximal portion of the engagement portion is pressed and therefore large bending moment acts upon the engagement portion. The cancelling portion cancels the state that the rotation of the spool in the webbing unwinding direction is stopped by the pretensioner. On the other hand, while the pretensioner operates, the vicinity of the proximal portion of the engagement portion is pressed and the cancelling portion allows the spool to rotate in the webbing winding direction. Due to this, it is possible to decrease only the tension load applied to the webbing during functioning as force limiter without decreasing the tension applied on the webbing during the pretensioner operation.

It is noted that the cancelling portion may be freely chosen from among those capable of rotating the spool relative to the pretensioner. They include, for example, a plastically deformable member, an elastically deformable member, a member to be broken, a clutch, a friction plate and the like.

In the fourth aspect according to the present invention in the third mode stated above, the cancelling portion is a portion to be broken having strength such that the portion to be broken is not broken when the vicinity of the proximal portion of the engagement portion is pressed and is broken when a tip end portion of the engagement portion is pressed.

When a deceleration of a predetermined value or more is applied to the vehicle and the rotation member is rotated in the webbing winding direction, the rotation member presses the vicinity of the proximal portion of the engagement portion protruding from the coupling member. Due to this, the bending moment acting upon the proximal portion becomes small and substantially only the shearing force acts thereupon. The proximal portion has strength at which it is not broken only by the shearing force when pressed. The engagement portion is pressed by the rotation member and the coupling member is rotated. Since the coupling member is coupled to the spool and the rotation of the rotation member in the webbing winding direction is transmitted via the coupling member to the spool, the spool is rotated in the webbing winding direction and thereby the webbing is wound on the spool.

When the coupling member is rotated in the webbing unwinding direction in response to the rotational force applied the spool in the webbing unwinding direction after the energy absorbing member has been deformed by the rotational force (torsion of the predetermined value or more) in the webbing unwinding direction, the rotation member presses the tip end portion of the engagement portion. As a result, compared with a case where the vicinity of the proximal portion is pressed, larger bending moment (as well as shearing force) acts upon the portion to be broken. The portion to be broken is broken, since the portion to be broken has strength such that it is broken by the bending moment when the tip portion of the engagement portion is pressed. Due to this, the spool is separated from the pretensioner, and therefore the spool becomes freely rotatable relative to the pretensioner.

As described above, when the rotation member is rotated in the webbing winding direction, the engagement portion is prevented from being broken. If the coupling member is rotated in response to the rotational force of the spool in the webbing unwinding direction, the portion to be broken is broken. Therefore, it is possible to decrease only the tension load during functioning as the force limiter without decreasing the tension applied to the webbing during the pretensioner operation.

BRIEF DESCRIPTION OF THE DRAWINGS

FIG. 2 is a cross-sectional view taken along lines II—II of FIG. 1.

FIG. 13 is a cross-sectional view showing that the webbing retractor is cut along the plane including the axis in the second embodiment according to the present invention.

FIG. 23A is a side view of an important portion showing that the drive plate has been rotated in the webbing unwinding direction and the to-be-broken part of the engagement portion is being broken following the state of FIG. 22A; and FIG. 23B is a cross-sectional view of the cylinder in this state.

DETAILED DESCRIPTION OF THE PREFERRED EMBODIMENTS

Figure 1:
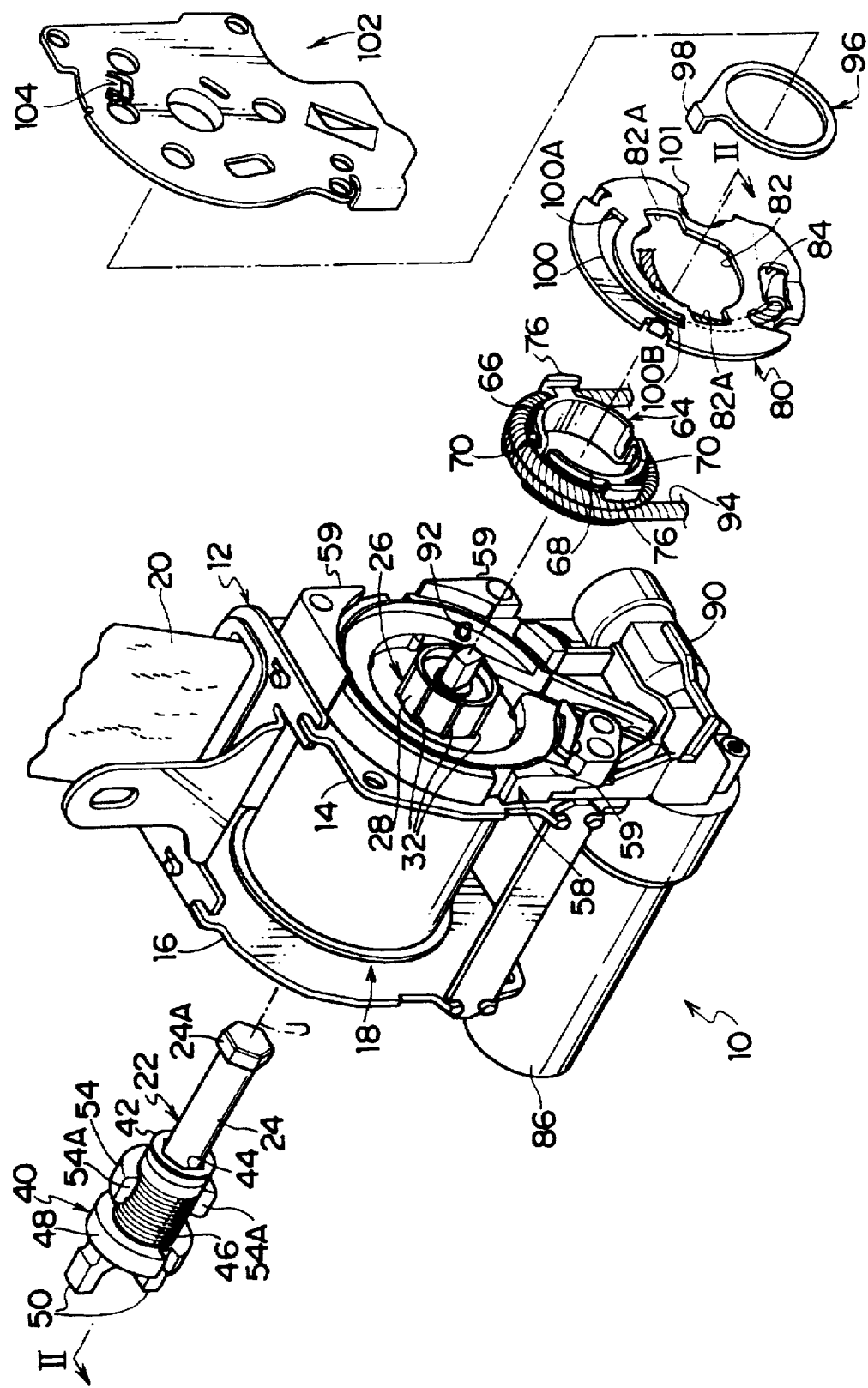
FIG. 1 is a perspectively exploded view of the webbing retractor in the first embodiment according to the present invention.
Figure 3:
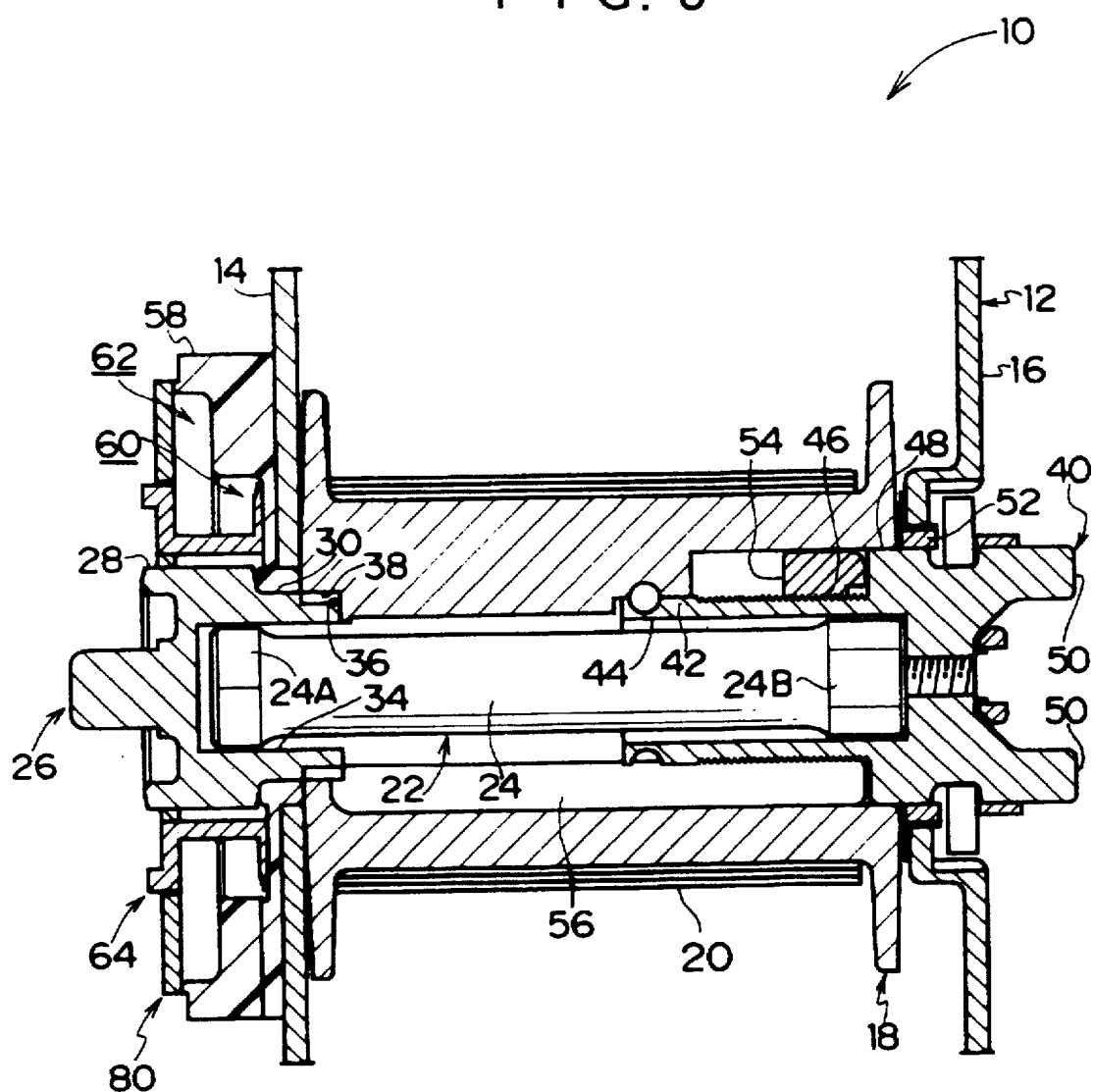
FIG. 3 is a cross-sectional view showing that the webbing has been unwound from the state of FIG. 2.

FIGS. 1 through 3 show a webbing retractor 10 in the first embodiment according to the present invention.

The webbing retractor 10 has a frame 12 installed into a vehicle (not shown). The frame 12 is provided with a pair of support plates 14 and 16 arranged in parallel. A spool 18 molded to be generally cylindrical and having flanges protruding from both ends of the spool 18 in the axial direction toward outside in the diameter direction, is provided between the support plates 14 and 16. One end of a webbing 20 is fixed to the spool 18, whereby the webbing 20 is wound thereon. FIGS. 1 and 2 show a state in which the webbing 20 has been wound on the spool 18. FIG. 3 shows a state in which the webbing 20 has been unwound from the spool 18.

A torsion portion 22 is provided inside the spool 18 in a coaxial manner with the central axis of the spool 18. The torsion portion 22 has, as an energy absorbing member, a generally cylindrical torsion bar 24 slightly longer than the spool 18 in the axial direction. The torsion bar 24 is made of plastically deformable material such as metal. The torsion bar 24 is plastically deformed and twisted when torsion of a predetermined value or more is applied to the bar 24 in the circumferential direction.

A hexagonal pillar-like insertion portion 24A is formed on one end of the torsion bar 24. The insertion portion 24A is inserted into a hexagonal insertion hole 34 formed in a pretension shaft 26 constituting the torsion portion 22. The torsion bar 24 and the pretension shaft 26 are rotated integrally with each other.

The pretension shaft 26 has a to-be-clamped portion 28 formed of generally cylindrical shape and a cylindrical gear portion 30 having a smaller diameter than that of the to-be-clamped portion 28 and formed integrally with the to-be-clamped portion 28 in a coaxial manner (see FIGS. 2 and 3). A plurality of protrusions 32 (see FIG. 1)are provided at predetermined intervals in the circumferential direction on the outer periphery of the to-be-clamped portion 28. The longitudinal direction of each protrusion 32 is the same as the direction of the central axis of the torsion bar 24 and has sharp tip end portion. They are bit into the inner surface of the drum 64 when clamping portions 66 and 68 to be described later clamp the to-be-clamped portion 28, thereby preventing the slipping of the drum 64.

A gear 36 is formed on the outer periphery of the gear portion 30. The gear 36 meshes with a gear 38 formed on the inner periphery of the spool 18, thus rotating the spool 18 and the pretension shaft 26 integrally with each other. Therefore, the torsion bar 24 is rotated on one end integrally with the spool 18 via the pretension shaft 26.

A locking shaft 40 constituting the torsion portion 22 is arranged on the other end (upper left in FIG. 1 and right in FIGS. 2 and 3) of the torsion bar 24. The locking shaft 40 is formed of generally cylindrical shape. A hexagonal insertion hole 44 is formed from one end in the axial direction. The shaft 40 also consists of a cylindrical portion 42 having a threaded portion 46 on the outer periphery, a disc portion 48 formed on the other end of the cylindrical portion 42, closing the insertion hole 44 and hanging outside in the direction of the diameter of the cylindrical portion 42, and a to-be-locked portion 50 protruding from the disc portion 48. A hexagonal pillar-like insertion portion 24B formed on the other end of the torsion bar 24 is inserted into the insertion hole 44, thus integrally rotating the torsion bar 24 and the locking shaft 40. FIG. 1 shows a state in which the insertion portion 24B has been inserted into the insertion hole 44.

In this way, while the insertion part 24B of the torsion bar 24 is inserted into the insertion hole 44, the spool 18 is arranged between the support plates 14 an 16. The gear 36 of the pretension shaft 26 meshes with the gear 38 of the spool 18 from the support plate 14 side, and the torsion bar 24 integral with the locking shaft 40 is inserted into the spool 18 from the support plate 16 side. As shown in FIGS. 2 and 3, the torsion bar 24 is arranged within the spool 18 in a coaxial manner with the spool 18. At this time, a portion of the outer periphery of the disk portion 48 positioned from the almost central portion to the cylindrical portion 42 side in the axial direction thereof abuts on the inner periphery of the spool 18. Therefore, the torsion portion 22 is positioned such that the central axis of the spool 18 coincides with that of the torsion bar 24. In addition, the portion the outer periphery of the disk portion 48 positioned from the almost central portion to the to-be-locked portion 50 side in the axial direction thereof is rotatably supported by the support plate 16 of the frame 12 via a ring 52. The portion of the gear portion 30 of the pretension shaft 26 on which the gear 36 is not formed, is rotatably supported by a cover drum 58 to be described later. By so doing, the spool 18 is rotatably supported by the frame 12.

The threaded portion 46 of the cylindrical portion 42 meshes with a ring 54 formed of generally annular shape, partly notched in the circumferential direction and having a threaded portion inside. While the torsion portion 22 is arranged inside the spool 18, an end face 54A of the ring 54 in the circumferential direction thereof comes in contact with a protruding bar 56 (see FIGS. 2 and 3) provided on the inner periphery of the spool 18 along the axial direction of the spool 18. In a normal state, the ring 54 is at one end side (the pretension shaft 26 side as shown in FIG. 2) of the threaded portion 46. When the spool 18 is rotated relative to the locking shaft portion 40, the ring 54 is also rotated together with the spool 18 and moved to the other end side (the disc 48 side; a position shown in FIG. 3). The movement is stopped when the ring 54 abuts against the disc 48. So is the rotation of the spool 18 around the locking shaft portion 40.

An inertial locking mechanism (not shown) is provided outside of the support plate 16 (on the side opposite where the spool 18 is provided; right in FIGS. 2 and 3). The inertial locking mechanism is designed to lock a to-be-locked portion 50 so as to stop the rotation of the torsion portion 22 in the direction of unwinding the webbing 20 when a deceleration of a predetermined value or more occurs to the vehicle into which the webbing retractor 10 is installed or the webbing 20 is unwound rapidly. However, the mechanism does not lock the to-be-locked portion 50 in the direction of winding the webbing 20.

Figure 4:
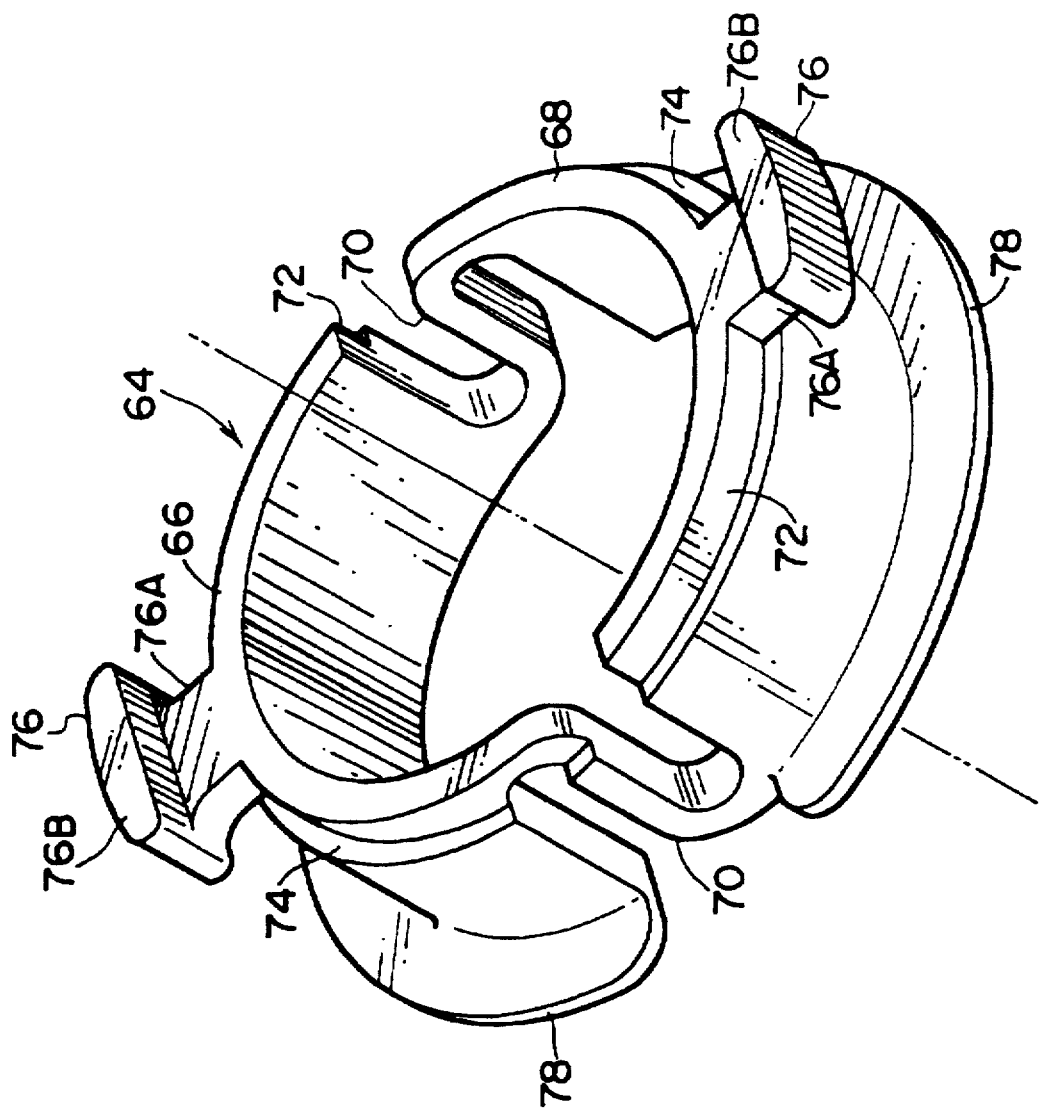
FIG. 4 is a perspective view of the drum of the webbing retractor in the first embodiment according to the present invention.
Figure 5A:
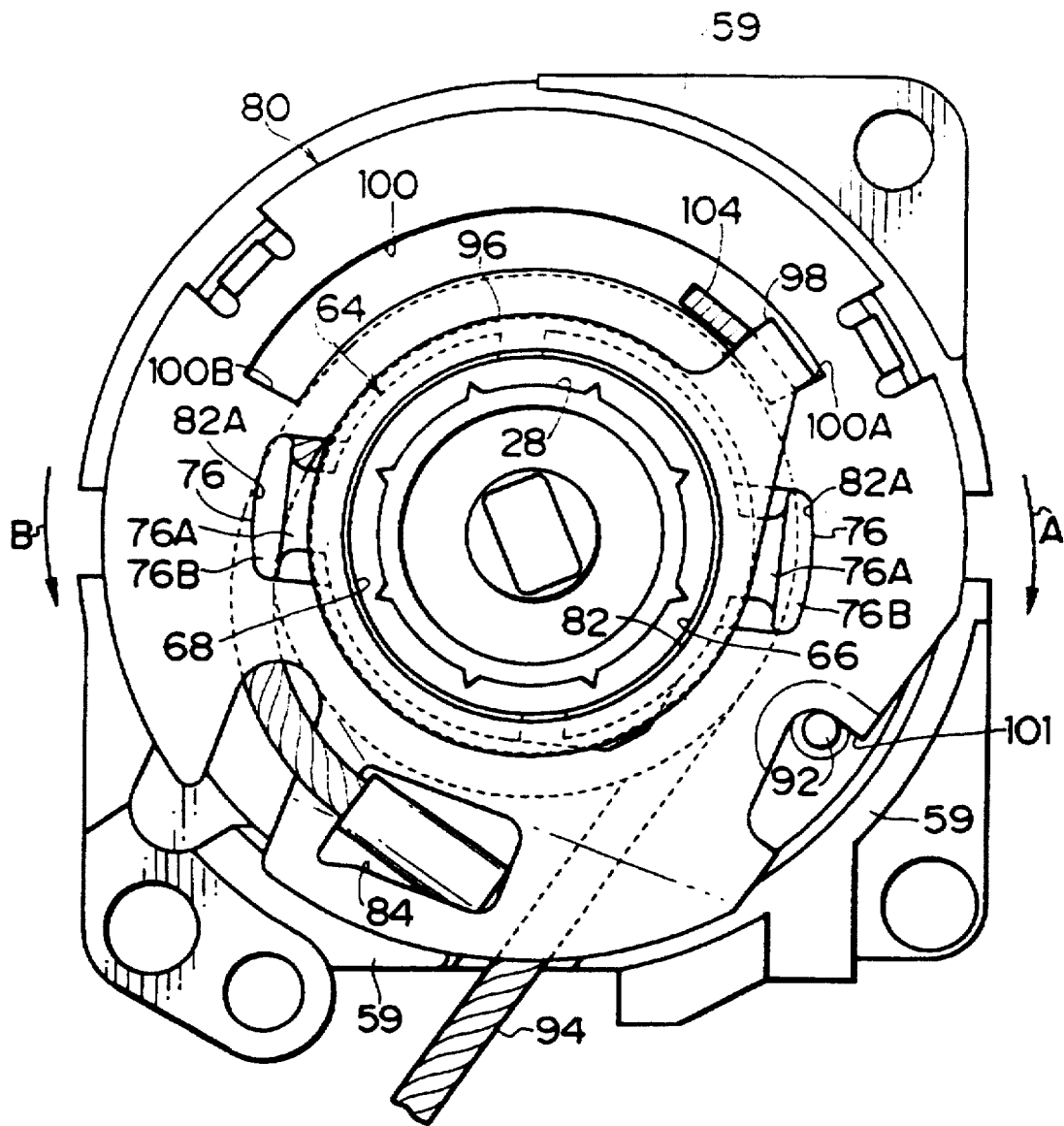
FIG. 5A is a side view of an important portion of the webbing retractor in the first embodiment according to the present invention.
Figure 6A:
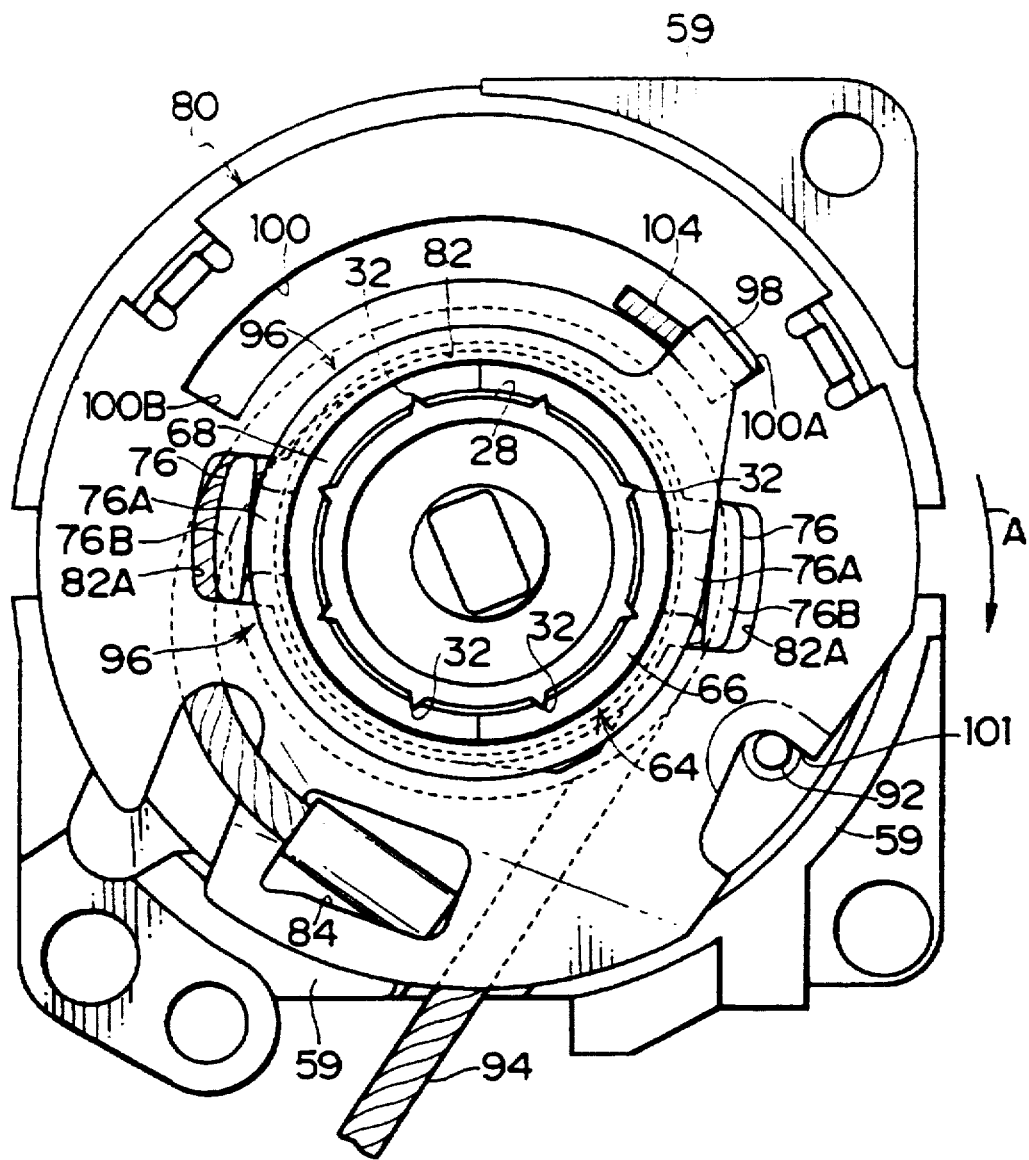
FIG. 6A is a side view of an important portion in a state where the drum has caught the pretension shaft following the state of FIG. 5A.

Meanwhile, the cover drum 58 having receiving portions 60 and 62 is fixed to the outside of the support plate 14 (left in FIGS. 2 and 3). The receiving portion 62 has a larger inner diameter than that of the receiving portion 60. A drum 64, around which a wire 94 to be described later is wound, is arranged in the receiving portion 60 (which is closer to the support plate 14) coaxially with the torsion bar 24. The drum 64 is made of metal (such as aluminum) softer than the locking shaft 40 and the pretension shaft 26. Moreover, as shown in FIG. 4 in detail, the drum 64 is arranged such that generally semi-annular clamping portions 66 and 68 face each other and constitute a generally cylindrical shape as a whole. In this state, corresponding portions of the clamping portions 66 and 68 on both ends in the circumferential direction are connected to each other by a generally S-shaped compression portion 70 integrally molded with the clamping portions 66 and 68. Normally, as shown in FIG. 5A, while the drum 64 is arranged in the receiving portion 60 (see FIGS. 2 and 3), inner surfaces of the clamping portions 66 and 68 are spaced from the tip end portions of the protrusion 32 of the to-be-clamped portion 28 by a predetermined short distance. The drum 64 is separated from the pretension shaft 26 in the receiving portion 60. The compression portion 70 (see FIG. 4) is compression-deformed by the force applied when the clamping portions 66 and 68 approach to each other. As shown in FIG. 6A, therefore, when the clamping portions 66 and 68 approach to each other, they clamp the to-be-clamped part 28. Since the drum 64 is made of metal softer than that of the pretension shaft 26, the protrusions 32 bite into the inner surfaces of the clamping portions 66 and 68. As a result, the drum 64 and the pretension shaft 26 are rotated integrally with each other.

Smaller diameter portions 72 are formed on one ends of the clamping portions 66 and 68 in the axial direction of the drum 64. Positioning stepped portions 74 are defined the outer surface of the drum 64 between the smaller diameter portions 72 and the other outer surface portion of the drum 64. An engagement portion 76 is protruded from the generally central position of each smaller diameter part 72 in the circumferential direction toward the outside in the diameter direction of the drum 64. The engagement portion 76 consists of a portion to be broken 76A having a smaller width on the clamping parts 66 or 68 side and an engaging portion 76B having a larger width and formed at the tip end portion of the portion to be broken 76A. The engaging portion 76B is reinforced by having a larger width than that of the portion to be broken 76A toward one end of the drum 64 in the axial direction. When the engaging portion 76B is given a force of a predetermined value or more in the circumferential direction of the drum 64, the portion to be broken 76A is broken and the engaging portion 76B is separated from the drum 64.

Flanges 78 protruding outward are formed on other ends of the clamping portions 66 and 68, thereby reinforcing the clamping portions 66 and 68.

A generally disc-like drive plate 80 is arranged outside of the cover drum 58 (on the opposite side of the support plate 14; left in FIGS. 2 and 3). Since three portions on the outer periphery of the drive plate 80 are surrounded by ribs 59 formed on the cover drum 58, the drive plate 80 is rotatably coaxial with the torsion bar 24. As shown in FIG. 5A, a generally circular insertion hole 82 into which the smaller diameter portion 72 of the drum 64 is inserted, is formed at the center of the drive plate 80. When the smaller diameter portion 72 is inserted into the hole 82, the positioning stepped portion 74 of the drum 64 abuts against the drive plate 80 and the drum 64 is positioned in the axial direction. Two recesses 82A into which the engagement portion 76 are inserted are formed on the drive plate 80 to communicate with the insertion hole 82. By means of each engagement portion 76 inserted into each recess 82A, the drive plate 80 and the drum 64 are rotated integrally with each other.

Figure 5B:
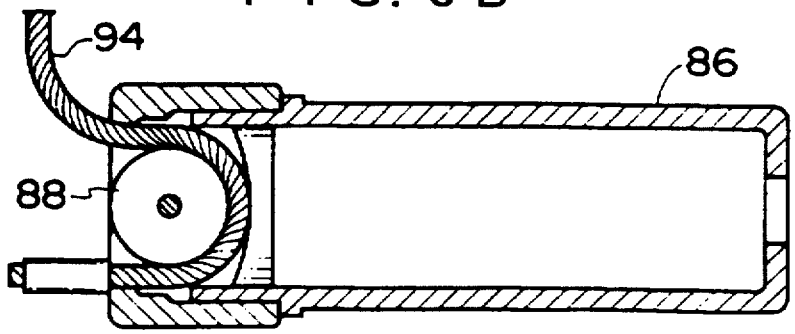
FIG. 5B is a cross-sectional view of the cylinder of the webbing retractor in the first embodiment according to the present invention.
Figure 6B:
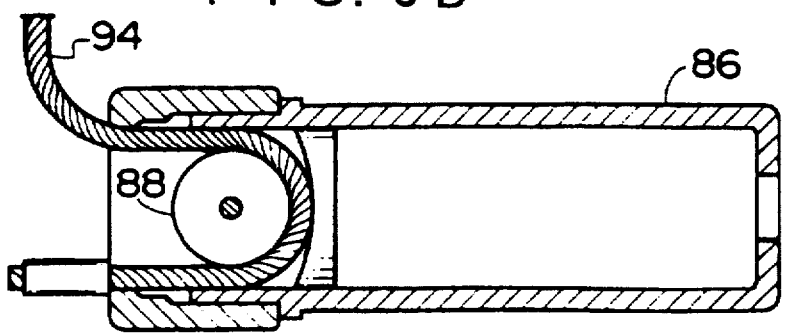
FIG. 6B is a cross-sectional view of the cylinder in this state.
Figure 7A:
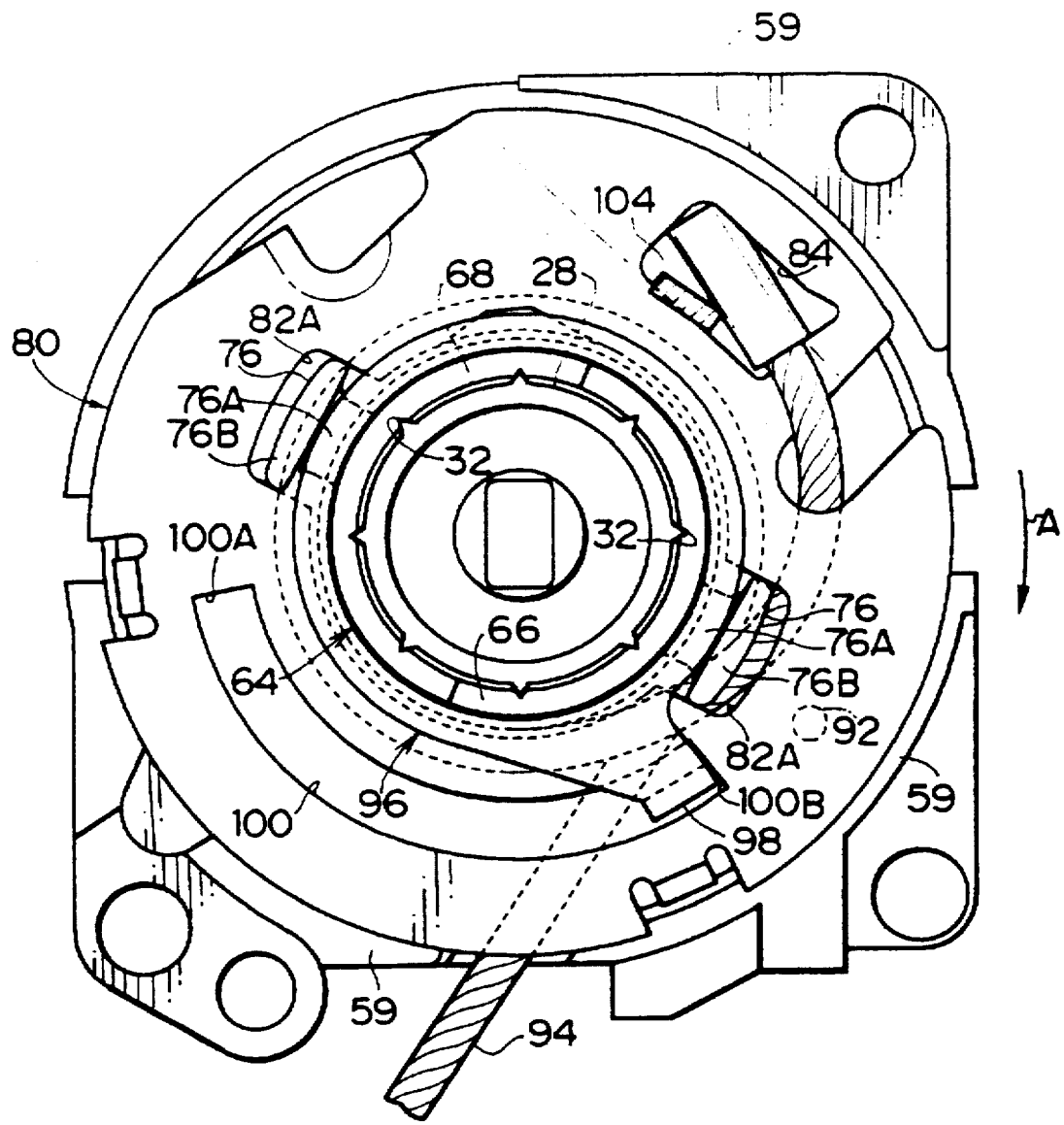
FIG. 7A is a side view of an important portion in a state where the drive plate has been rotated in the webbing winding direction following the state of FIG. 6A.
Figure 7B:
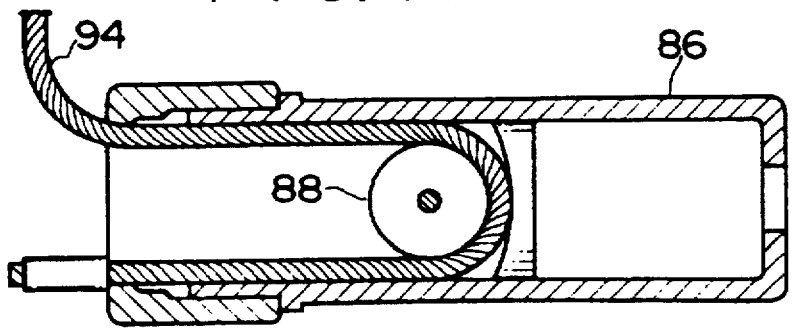
FIG. 7B is a cross-sectional view of the cylinder in this state.
Figure 8A:
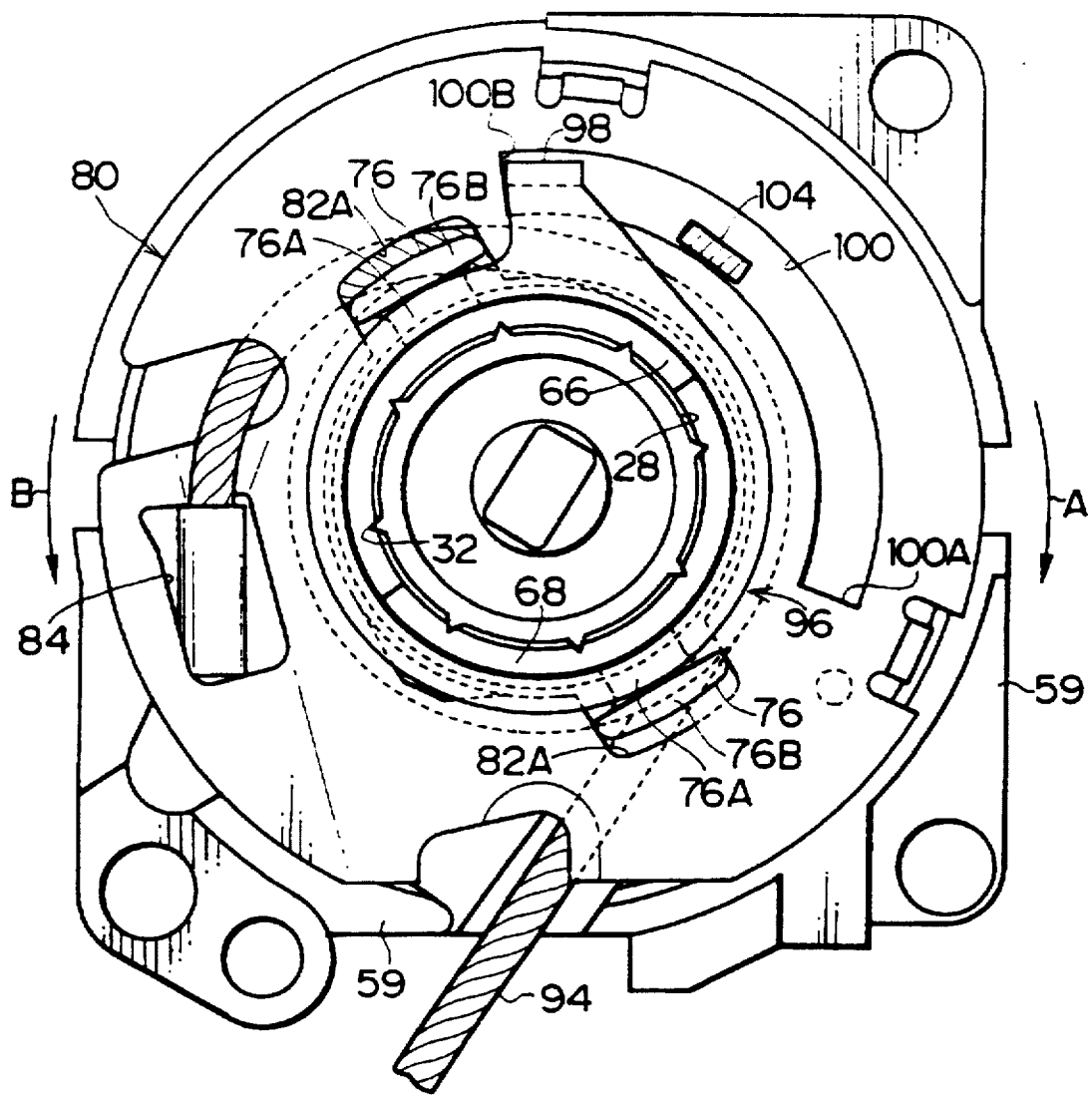
FIG. 8A is a side view of an important portion in a state where the drive plate has been rotated in the webbing winding direction following the state of FIG. 7A.
Figure 8B:
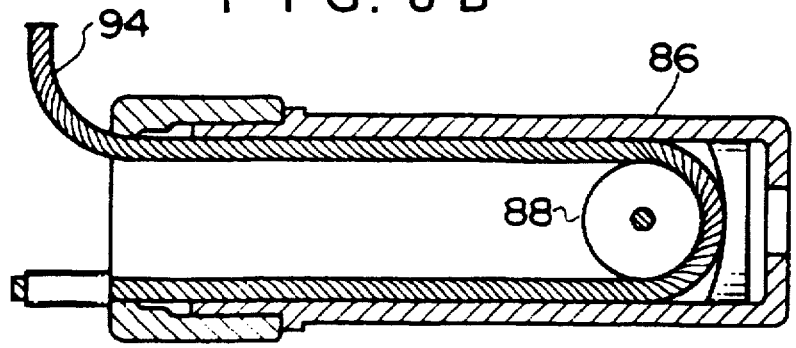
FIG. 8B is a cross-sectional view of the cylinder in this state.

A fixation portion 84, to which a cylindrical member provided on one end of the wire 94 is fitted and fixed, is provided on the drive plate 80. The wire 94 having the one end fixed to the fixation portion 84 is wound around the drum 64 a plurality of times (almost twice in this embodiment). The other end of the wire 94 is wound around the piston 88 (see FIG. 5B) within the cylinder provided at the frame 12, whereby the wire 94 is fixed to the outside of the cylinder 86. If a sensor (not shown) detects that a deceleration of a predetermined value or more occurs to the vehicle provided with the webbing retractor 10, a gas generator (not shown) within a base cartridge 90 provided at the frame 12 operates to move the piston 88 into the cylinder 86 rapidly as shown in FIGS. 6B, 7B and 8B. By the movement of the piston 88, the wire 94 is pulled rapidly, thereby applying rotation force to the drive plate 80.

As shown in FIGS. 1 and 5A, a shear pin 92 is protruded through the cover drum 58 from the frame 12. The shear pin 92 is engaged with an edge of a concave portion 101 formed in the drive plate 80. Due to this, the drive plate 80 is not normally rotated in the direction of winding the webbing 20 (the arrow A direction in FIG. 5A). However, if the wire 94 is pulled into the cylinder 86 rapidly and the rotation force of the predetermined value or more is applied to the drive plate 80, the shear pin 92 is pressed and broken by the edge of the concave 101 and the drive plate 80 is rotated.

A generally annular stopper plate 96 is provided outside of the drive plate 80. The stopper plate 96 is rotatably supported around the central axis J of the torsion bar 24 and in a coaxial manner with the torsion bar 24 by a positioning member (not shown) (For brevity, the stopper plate 96 and a cover plate 102 to be described later are not illustrated in FIGS. 2 and 3.) A move protrusion 98 extending outward in the diameter direction and having a tip end portion bent at approximately right angle toward the drive plate 80 side is formed on the stopper plate 96. The tip end portion of the move protrusion 98 is located within a long hole 100 cut off to be a generally arc shape along the circumferential direction of the drive plate 80. By the relative rotation of the stopper plate 96 and the drive plate 80, the move protrusion 98 moves within the long hole 100. The central angle of the long hole 100 is set at about 90° and the stopper plate 96 and the drive plate 80 are rotated relative to each other by about 90°.

A cover plate 102 is provided outside of the stopper plate 96 and fixed to the cover drum 58. The cover plate 102 allows a state in which the drum 64, the drive plate 80 and the stopper plate 96 are housed in the receiving portions 60 and 62 of the cover drum 58, to be maintained.

A stopper protrusion 104 is protruded from the cover plate 102 toward the stopper plate 96. The stopper protrusion 104 is designed such that it abuts against the move protrusion 98 but does not enter the long opening 100. As shown in FIG. 5A, when a deceleration of a predetermined value or more is not applied to the webbing retractor 10, the move protrusion 98 of the stopper plate 96 is located in the lower right of the stopper protrusion 104 (in the direction of winding the webbing 20) in FIG. 5A and one end wall 100A of the long opening 100 of the drive plate 80 is located in the further lower right in FIG. 5A.

Moreover, when the wire 94 is pulled into the cylinder 86 and the drive plate 80 is rotated in the webbing winding direction (the arrow A direction in FIG. 5A), the long opening 100 moves as well and the move protrusion 98 abuts against the other end wall 100B of the long opening 100. When the drive plate 80 is further rotated, as shown in FIG. 7A, the move protrusion 98 is pressed by the other end wall 100B of the long opening 100 and the stopper plate 96 is rotated along with the drive plate 80. If the drive plate 80 is further rotated as shown in FIG. 8A, then the wire 94 is pulled into the cylinder 86 by the piston 88, the piston 88 reaches the base or bottom of the cylinder 86, the pulling of wire 94 is finished and the rotation of the drive plate 80 is stopped.

In this way, in the early rotation stage, the drive plate 80 is rotated by about 90° while the stopper plate 96 is still. Next, the drive plate 80 is rotated by about 360° along with the stopper plate 96. In all, from the start to the end of rotation, the drive plate 80 is rotated by about 450°. It is possible to change the speed of the relative rotation of the drive plate 80 and the stopper plate 96 and to change the rotational speed of the drive plate 80 by changing the length of the long opening 100. In addition, while the drive plate 80 is still rotated, the moving protrusion 98 can be located anywhere within the long opening 100. What is required is to rotate the drive plate 80 by about 450° from the start to the end of the rotation.

Next, description will be given to the operation and function of the webbing retractor 10 in the embodiment according to the present invention.

In an ordinary running state of the vehicle, that is, during a deceleration of the vehicle provided with the webbing retractor 10 does not reach a predetermined one, the inertial locking mechanism (not shown) does not lock the to-be-locked portions 50 nor does the gas generator within the base cartridge 90 operate. Due to this, the wire 94 is not pulled into the cylinder 86. As a result, the spool 18 (see FIGS. 1 through 3) can is freely be rotated, making it possible to unwind or wind the webbing 20.

When a deceleration of the predetermined value or more occurs to the vehicle, the inertial locking mechanism locks the rotation of the to-be-locked portions 50 in the direction of unwinding the webbing 20 (the arrow B direction in FIG. 5A). Therefore, the rotation of the spool 18 which is rotated together with the torsion portion 22 in the direction of unwinding the webbing 20 is also locked, whereby it is impossible to further unwind the webbing 20 from the spool 18.

Additionally, since the gas generator operates to move the piston 88 into the cylinder 86 as shown in FIG. 6B, the wire 94 is rapidly pulled into the cylinder 86. Here, the rotation of the drive plate 80 is stopped by the shear pin 92 and the drum 64 is not rotated. Due to this, the drum 64 around which the wire 94 is wound is suddenly tightened by the wire 94 and the compression part 70 (see FIG. 4) is compression-deformed. Then, as shown in FIG. 6A, the clamping portions 66 and 68 approach to each other and clamp the to-be-clamped portion 28 of the pretension shaft 26. Since the drum 64 is made of softer metal than the to-be-clamped portion 28, the protrusions 32 of the to-be-clamped portion 28 catch the inner surfaces of the clamping portions 66 and 68, whereby the drum 64 and the pretension shaft 26 become integral with each other.

When the wire 94 is further pulled into the cylinder 86, rotation force is applied to the drive plate 80 and the edge of the concave portion 101 presses and breaks the shear pin 92. As a result, as shown in FIG. 7A, the drive plate 80 is rotated in the webbing winding direction (the arrow A direction in FIG. 7A). Since the respective engagement portions 76 of the drum 64 are inserted into the recesses 82A of the drive plate 80, the drum 64 is rotated together with the drive plate 80. The gear 36 formed at the gear portion 30 of the pretension shaft 26 meshes with the gear 38 in the inner periphery of the spool 18. At the same time, the inertial locking mechanism (not shown) does not lock the rotation of the locking shaft 40 in the direction of winding the webbing 20. By the rotation of the drum 64, therefore, the spool 18 is rotated in the direction of winding the webbing 20 (the arrow A direction in FIG. 7A) via the pretension shaft 26. When the piston 88 is moved into the cylinder 86 and the wire 94 is pulled into the cylinder 86 to a maximum as shown in FIG. 8B, the drive plate 80 is rotated by about 450° from the initial state to most tense the webbing 20 as shown in FIG. 8A. As a result, the webbing 20 is tightly fitted to the occupant of the vehicle.

Next, when the inertia force of the occupant applied with the webbing 20 causes a unwinding force of the predetermined value or more, the unwinding force acts as the rotational force in the direction of unwinding the webbing 20 (the arrow B direction in FIG. 8A) from the spool 18. Here, the inertial locking mechanism (not shown) locks the rotation of the locking shaft 40 in the direction of unwinding the webbing 20. Due to this, the rotation of the torsion bar 24 whose insertion portion 24B on the other end thereof is inserted into the insertion hole 44 of the locking shaft 40, is locked as well. Meanwhile, the insertion portion 24A on one end of the torsion bar 24 is inserted into the pretension shaft portion 26. The pretension shaft portion 26 is rotated integrally with the spool 18 by the mesh of the gear 36 with the gear 38. The rotational force of the spool 18 is transmitted to the torsion bar 24 via the pretension shaft portion 26 and the torsion bar 24 is plastically deformed and starts to be twisted. Then, the force limiter preventing tension of the predetermined value or more from acting upon the webbing 20 starts functioning. At this time, when the spool 18 is rotated around the locking shaft 40, the end face 54A of the partly notched ring 54 is pressed by the protrusion bar 56, whereby the ring 54 is rotated and starts moving toward the disc portion 48.

Figure 9A:
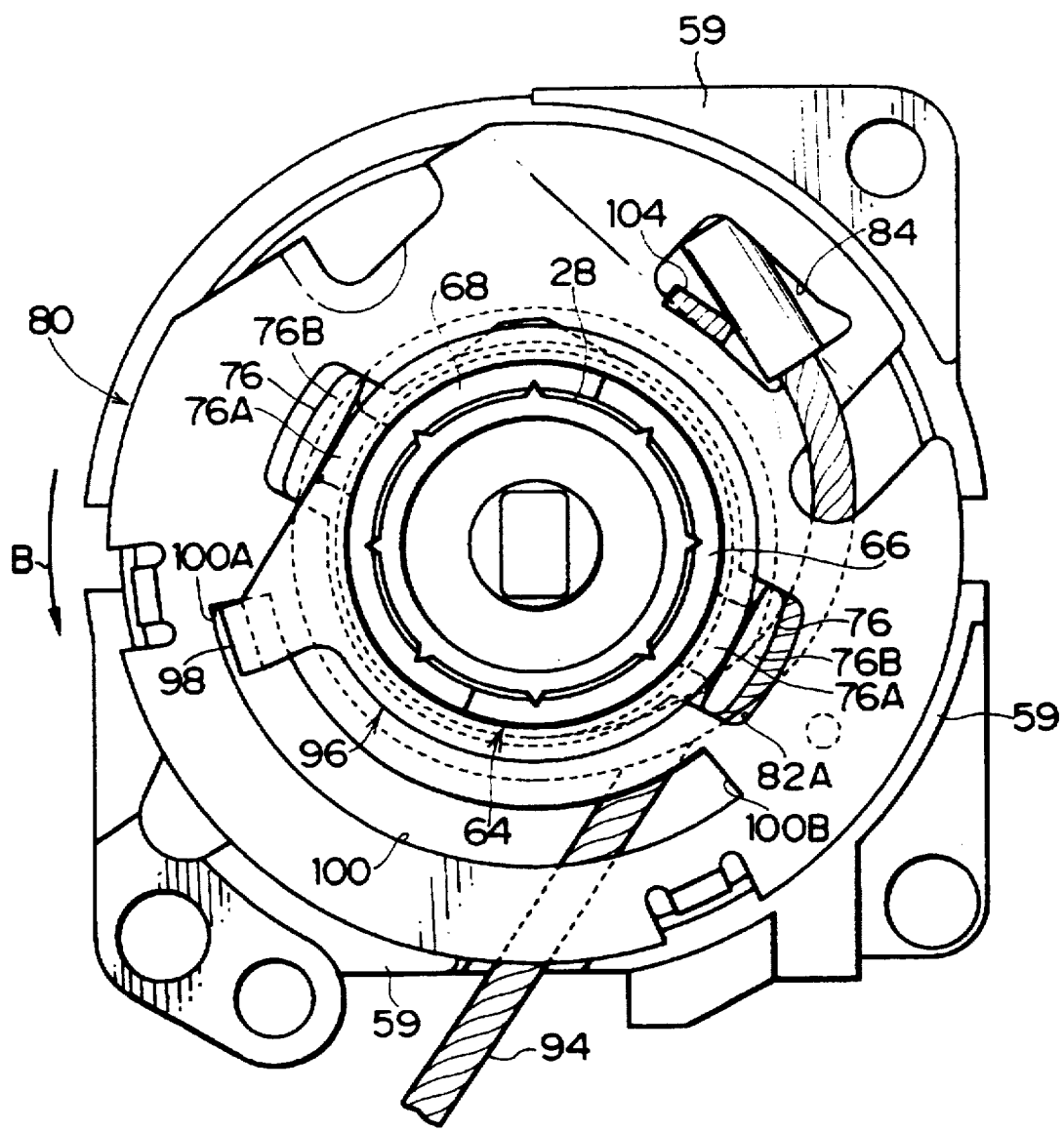
FIG. 9A is a side view of an important portion in a state where the drive plate has been rotated in the webbing unwinding direction following the state of FIG. 6A.
Figure 9B:
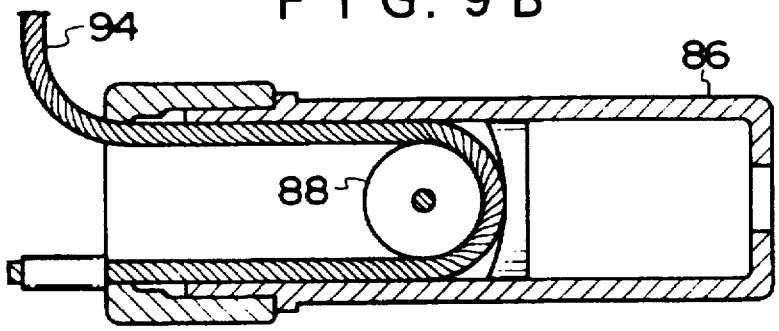
FIG. 9B is a cross-sectional view of the cylinder in this state.

The drum 64 catching the to-be-clamped portion 28 of the pretension shaft portion 26 is also rotated in the direction of unwinding the webbing 20 (the arrow B direction in FIG. 9A). Due to this, the drive plate 80 is also rotated in the direction of unwinding the webbing 20. The wire 94 is then pulled within the cylinder 86 and the piston 88 moves left within the cylinder 86 as shown in FIG. 9B.

At this time, since the drive plate 80 is rotated relative to the stopper plate 96, the one end wall 100A of the long opening 100 abuts against the move protrusion 98 by the rotation of the drive plate 80. Thereafter, the move protrusion 98 is pressed by the one end wall 100A of the long opening 100 and the stopper plate 96 is rotated integrally with the drive plate 80.

Figure 10A:
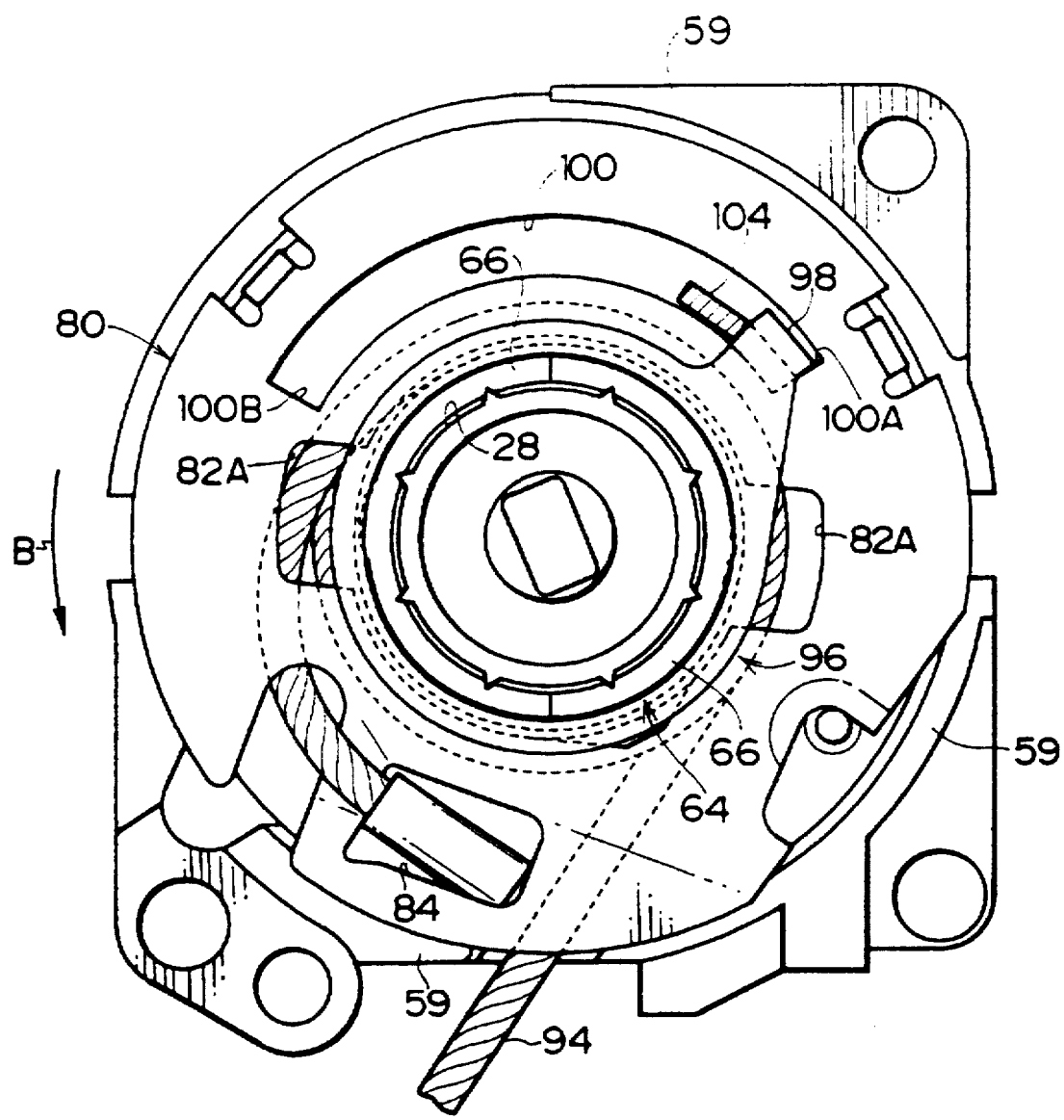
FIG. 10A is a side view of important parts in a state where the drive plate has been rotated in the webbing unwinding direction and the to-be-broken portion of the engagement portion is broken following the state of FIG. 9A.
Figure 10B:
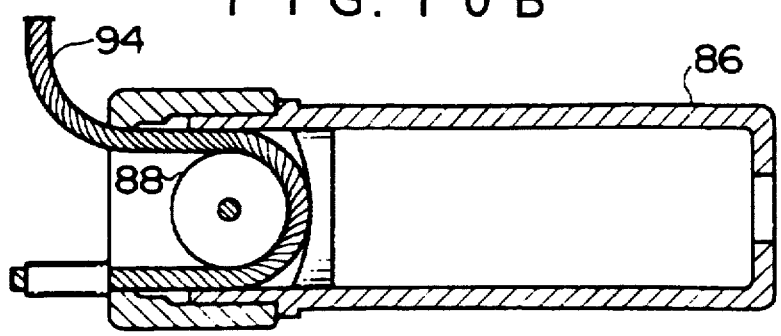
FIG. 10B is a cross-sectional view of the cylinder in this sate.

As shown in FIG. 10A, when the drive plate 80 has been rotated almost to the initial state (which is the same as that shown in FIG. 5A), the move protrusion 98 abuts against the stopper protrusion 104, thereby stopping the rotation of the drive plate 80. When the rotational force in the direction of unwinding the webbing 20 (the arrow B direction in FIG. 10A) further acts upon the spool 18 in that state, the drum 64 is rotated in the direction of unwinding the webbing 20. Owing to this, the rotational force acts upon the engagement portion 76 received the recesses 82A of the drive plate 80 which rotation has been stopped, and the portion to be broken 76A (see FIG. 4) is broken. As a result, the pretension shaft portion 26 is separated from the drive plate 80 and becomes rotatable relative to the drive plate 80, and the torsion bar 24 is further twisted. Thus, the function of the force limiter is continued and then the spool 18 is rotated in the direction of unwinding the webbing 20. The torsion-deformation of the torsion bar 24 is continued until the rotational force acting upon the pretension shaft portion 26 via the spool 18 by the unwinding of the webbing 20 is balanced with the torsion reaction of the torsion bar 24.

Figure 11A:
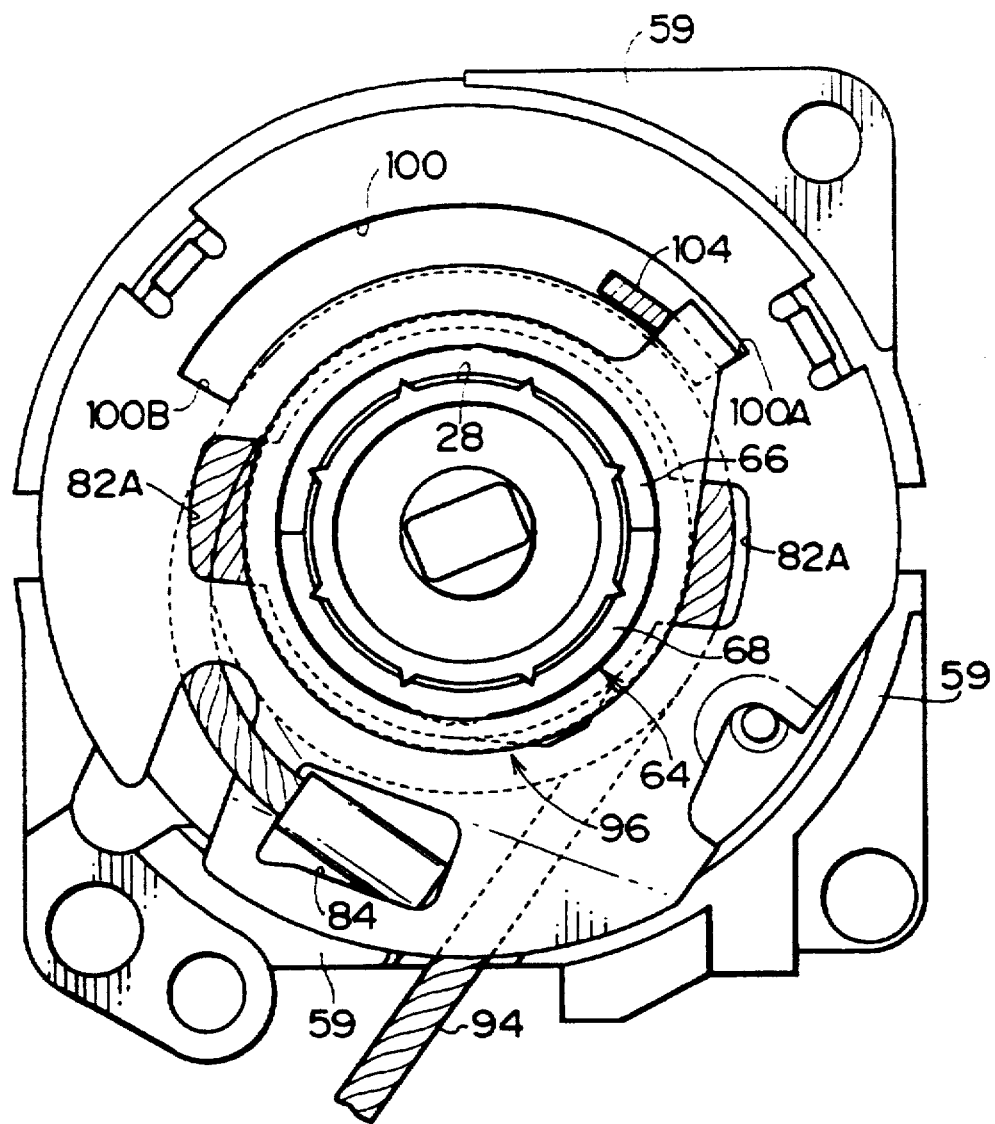
FIG. 11A is a side view of important portion in a state where the clamping portion of the drum and the pretension shaft have been rotated in the webbing unwinding direction and the to-be-broken part of the engagement portion has been broken following the state of FIG. 10A.
Figure 11B:
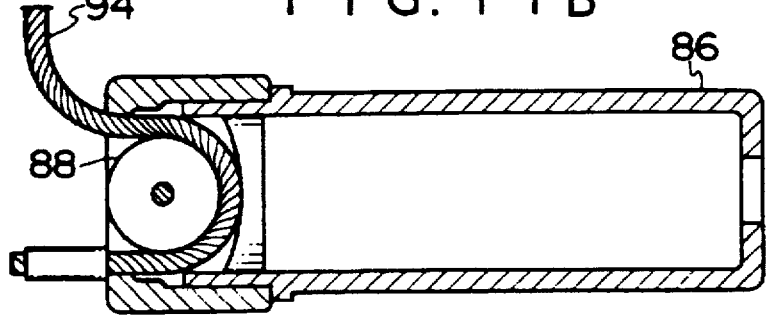
FIG. 11B is a cross-sectional view of the cylinder in this sate.

As shown in FIG. 11A, in response to the rotational angle by the torsion-deformation of the torsion bar 24, the clamping portions 66 and 68, the pretension shaft portion 26 and the spool 18 (see FIGS. 1 through 3) are rotated and the webbing 20 is unwound, thus force limiter functions for preventing tension load applied to the webbing 20 from exceeding a predetermined value.

When the rotational force acting upon the spool 18 is large, the partly cut-off ring 54 which has moved toward the disc 48 abuts against the disc portion 48 (see FIG. 3) and the ring 54 does not further move. As a result, the rotation of the spool 18 is stopped, thereby preventing the torsion bar 24 from being excessively torsion-deformed and being cut off. In addition, since the rotation of the spool 18 can be stopped when the partially cut-off ring 54 is rotated and abuts against the disc portion 48, the relative rotation speed of the spool 18 to the locking shaft 40 can be changed by adjusting the initial position of the ring 54. As a result, by adjusting the torsion degree of the torsion bar 24, the degree of unwinding the webbing 20 during force limiter operation can be adjusted.

As described above, in the webbing retractor 10 in this embodiment, when the rotational force in the direction of unwinding the webbing 20 acts upon the spool 18 after the drum 64 has clamped the pretension shaft portion 26, the portion to be broken 76A of the drum 64 is broken and the pretension shaft portion 26 is rotatable relative to the pretensioner drive plate 80. Therefore, it is possible to carry out the force limiter function while sufficiently torsion-deforming the torsion bar 24.

The cancelling portion or cancelling means should not be limited to the above-stated portion to be broken 76A. Various structures are possible as long as they are intended to couple the pretensioner and the spool 18 when the rotational load in the direction of unwinding the webbing 20 is applied by the pretensioner and to make the spool 18 rotatable relative to the pretensioner when load in the direction of unwinding the webbing 20 is applied to the spool. For example, a plastically or elastically deformable portion can be formed instead of the portion to be broken 76A. The deformable portion is deformed by the shearing force or bending force acting upon the engagement portion 76, to thereby cancel the stop of the rotation of the spool 18 in the direction of unwinding the webbing 20 by the pretensioner and to allow the pretension shaft 26 to be rotatable relative to the drive plate 80 of the pretensioner. Alternatively, a gear on the outer periphery of the drum 64 and that on the inner periphery of the insertion hole 82 of the drive plate 80, which mesh with each other, can be formed instead of the engagement portions 76. By crushing the gears, the pretension shaft portion 26 may be rotatable relative to the drive plate 80. It is also possible to use clutches, friction plates and the like.

Furthermore, the energy absorbing member should not be limited to the above-stated torsion bar 24. It is freely chosen from among those deformed by the rotation of the spool 18 in the direction of unwinding the webbing 20, producing friction and flowing viscous fluid to thereby absorb kinetic energy and to prevent an increase in the tension acting upon the webbing 20. They include, for example, an energy absorbing member which moves toward the axial direction of the spool 18 by the rotation of the spool 18 and prevents an increase in the tension acting on the webbing 20 by generating resistance by deformation, friction and the like. Those energy absorbing members are not necessarily coaxial with the spool 18.

The above embodiment illustrates a case where the locking portion which locks the rotation of the spool 18 in the direction of unwinding the webbing 20 when detecting a deceleration of a predetermined value or more and which allows the rotation of the spool 18 only in the direction of winding the webbing 20, is provided on the other end of the spool 18. However, such a locking portion is not necessarily required. Instead, it is possible that the rotation of the spool 18 in the unwinding direction is locked after the webbing 20 has been applied to the occupant of the vehicle, irrespectively of the degree of the deceleration of the vehicle, and only the rotation of the spool in the webbing winding direction is allowed. When the rotation of the spool 18 is locked, there is no need to provide the locking portion on the other end of the spool 18. The locking portion may be provided to the spool 18 via the energy absorbing member.

Additionally, the above embodiment illustrates a case where the torsion bar 24 is rotated together with the spool 18 via the pretension shaft 26 provided on one end of the spool 18. However, the coupling structure of the torsion bar 24, the spool 18 and the pretension shaft 26 should not be limited to this case. The pretension shaft 26 or pretensioner may be coupled to the spool 18 and the torsion bar 24 may be irrespectively provided to the spool 18. For example, the torsion bar 24 may be provided on the other end of the spool 18 and rotated together with the spool 18.

Now, the second embodiment according to the present invention will be described.

Figure 12:
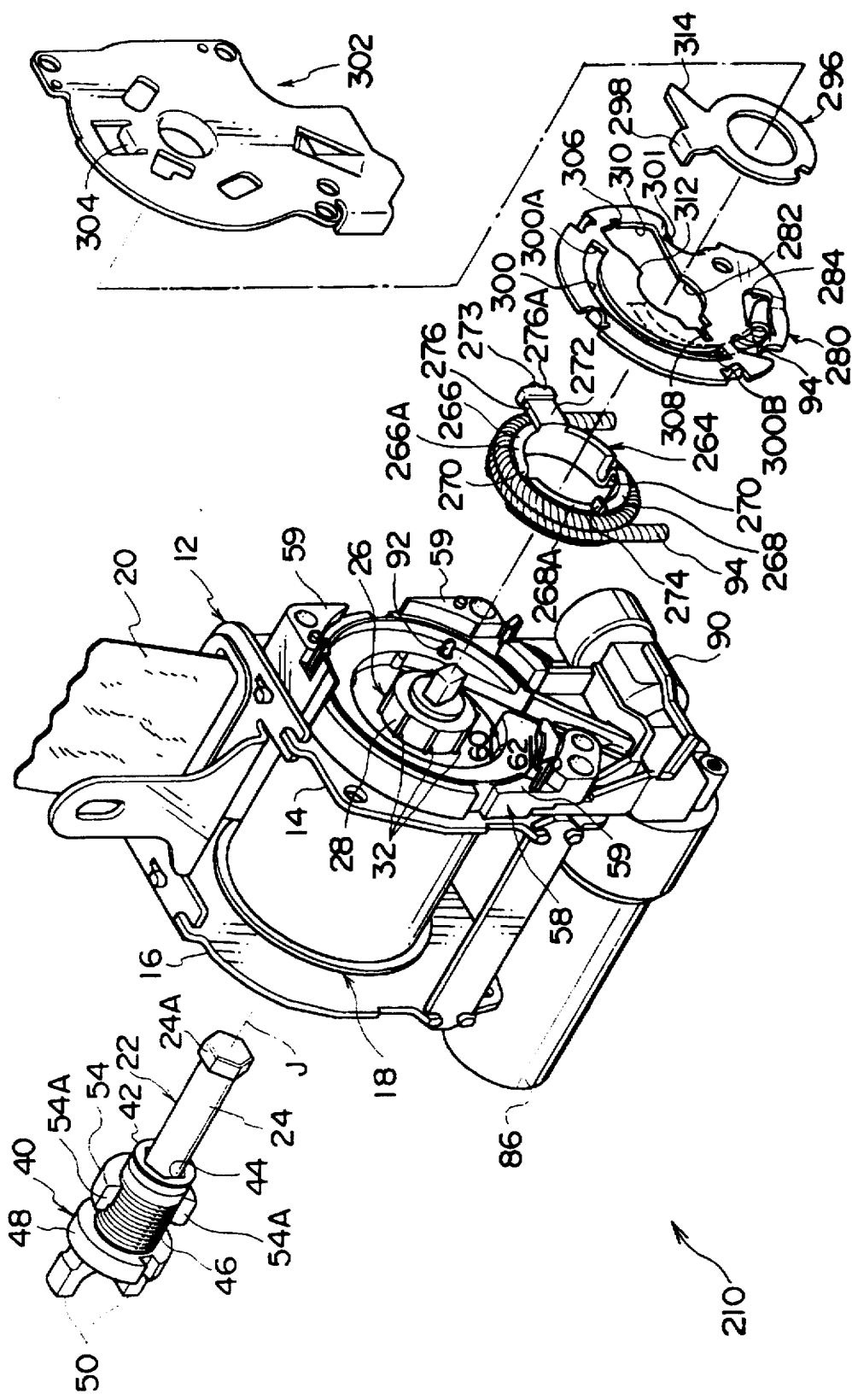
FIG. 12 is a perspectively exploded view showing the webbing retractor in the second embodiment according to the present invention.
Figure 14:
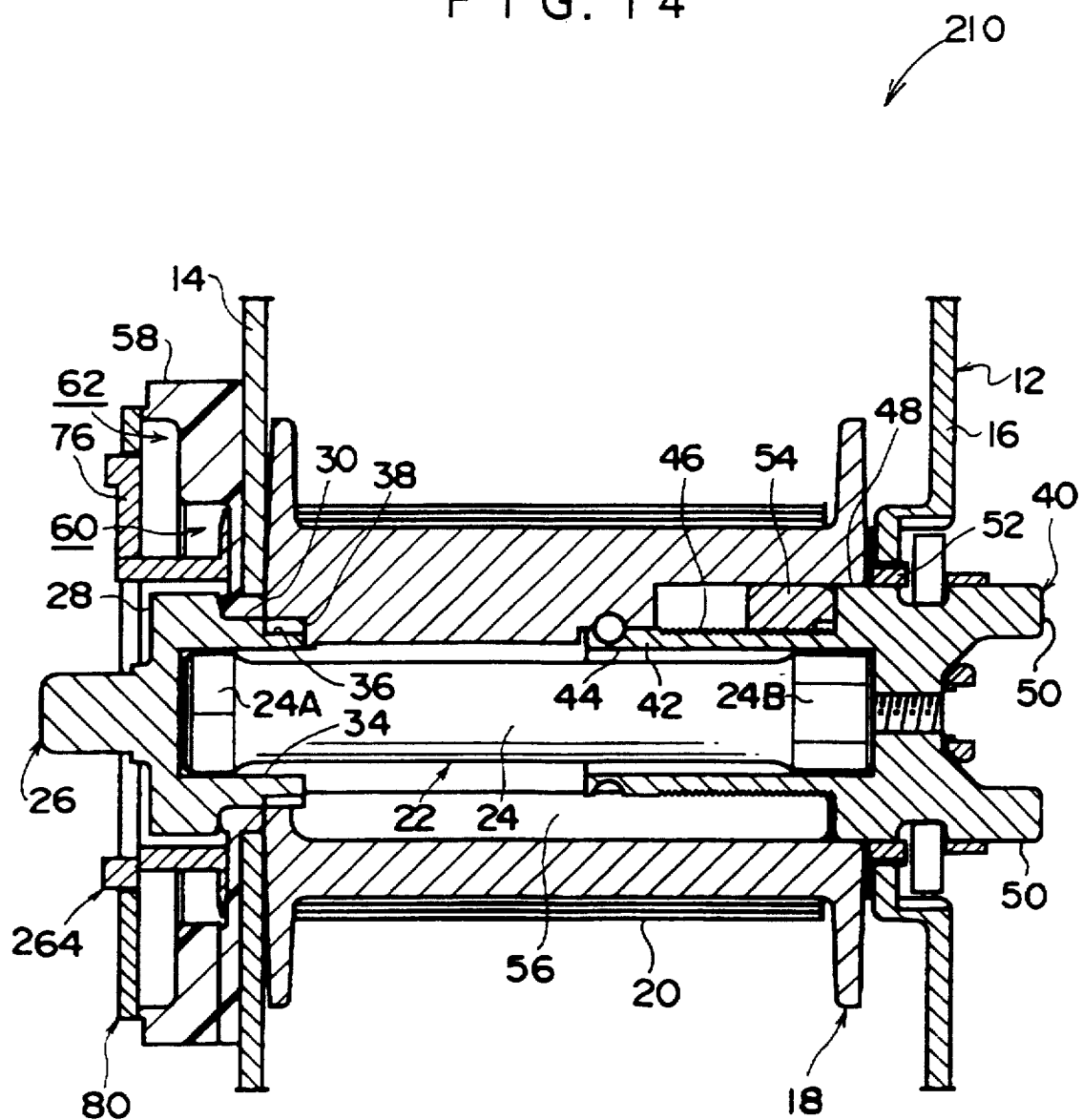
FIG. 14 is a cross-sectional view showing that the webbing has been unwound following the state of FIG. 13.

FIGS. 12 through 14 show the webbing retractor 210 in the second embodiment. In this embodiment, the same members, structures, parts and the like as those in the first embodiment are denoted by the same reference numerals and no detailed description will be given thereto.

The structure of the second embodiment different from the first embodiment will be first described.

A drum 264 around which the wire 94 is wound, is arranged in the receiving portion 60 (which is closer to the support plate 14) in a coaxial manner with the torsion bar 24.

Figure 15:
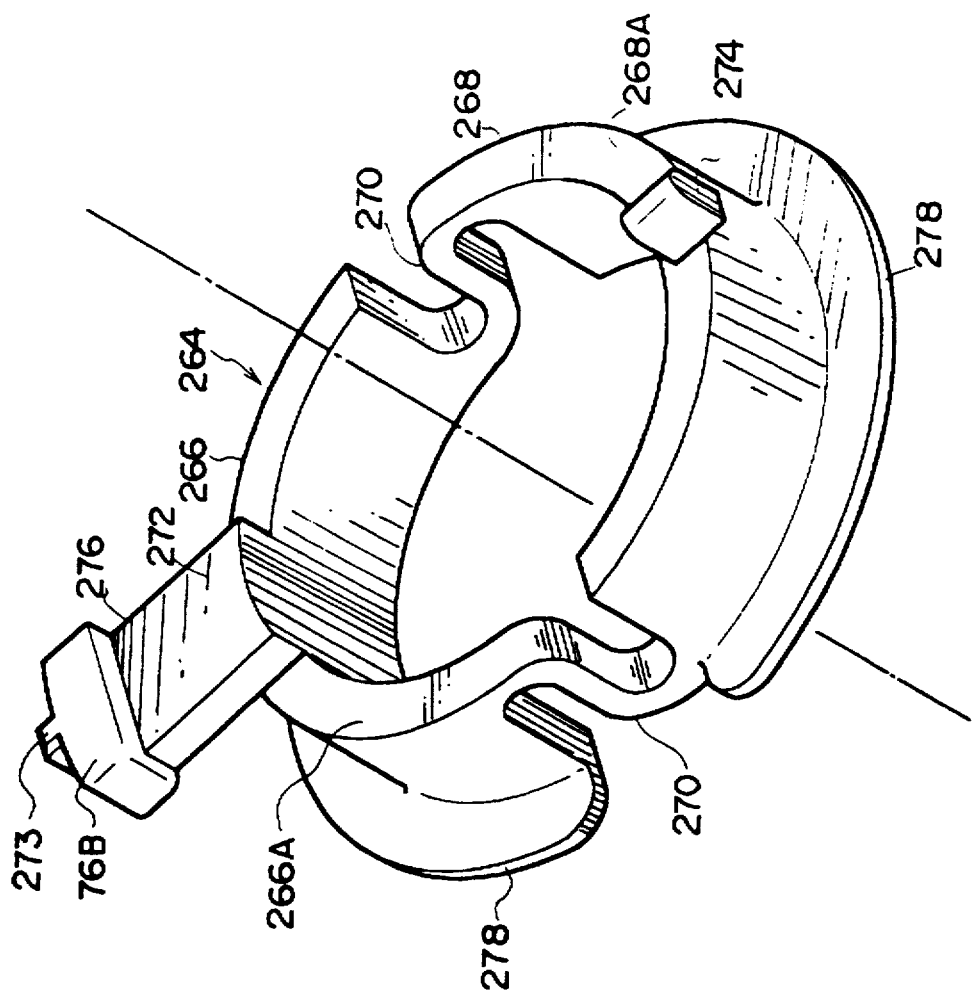
FIG. 15 is a perspective view showing the drum of the webbing retractor in the second embodiment according to the present invention.
Figure 16A:
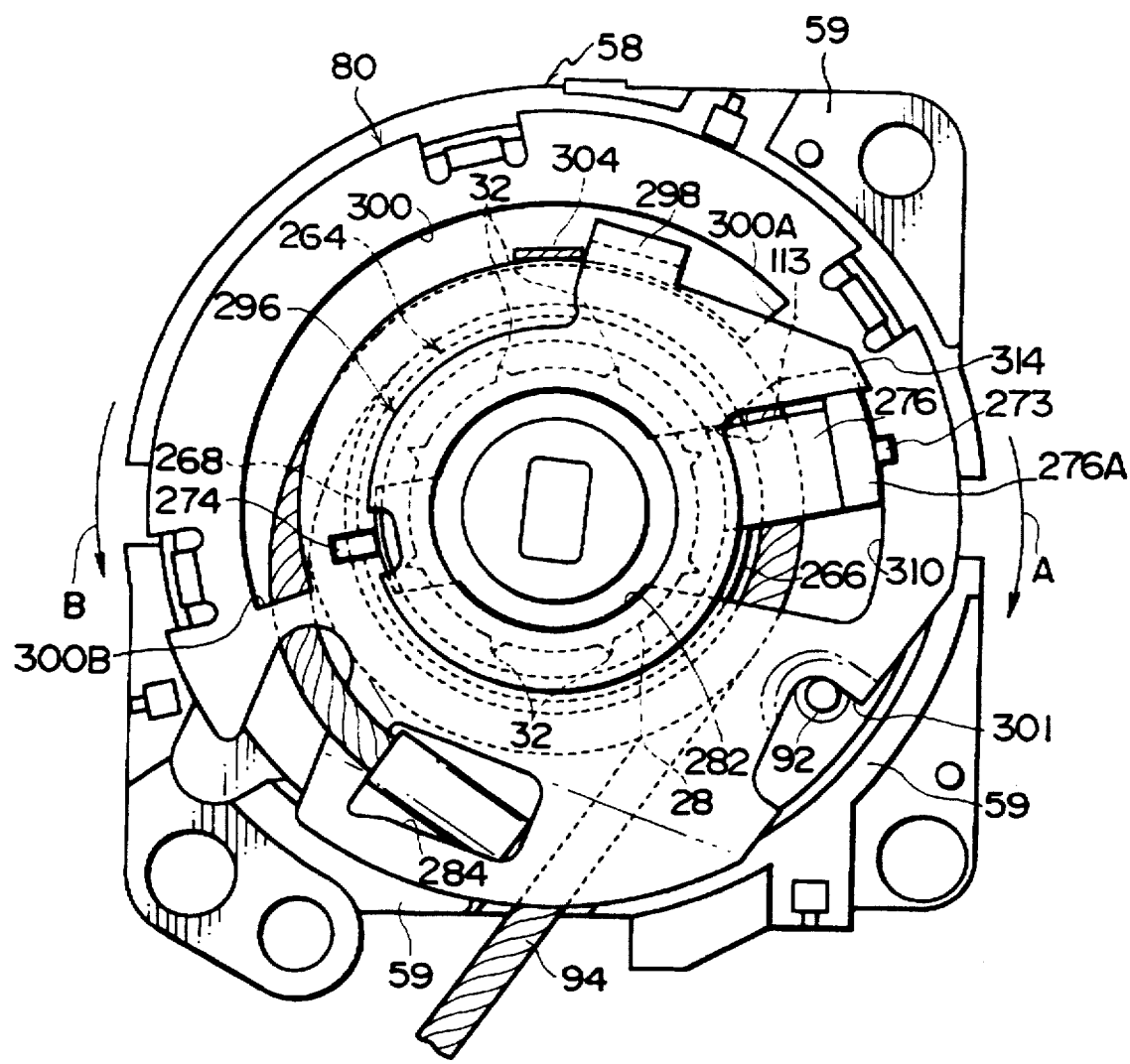
FIG. 16A is a side view of an important portion of the webbing retractor in the second embodiment according to the present invention.
Figure 18A:
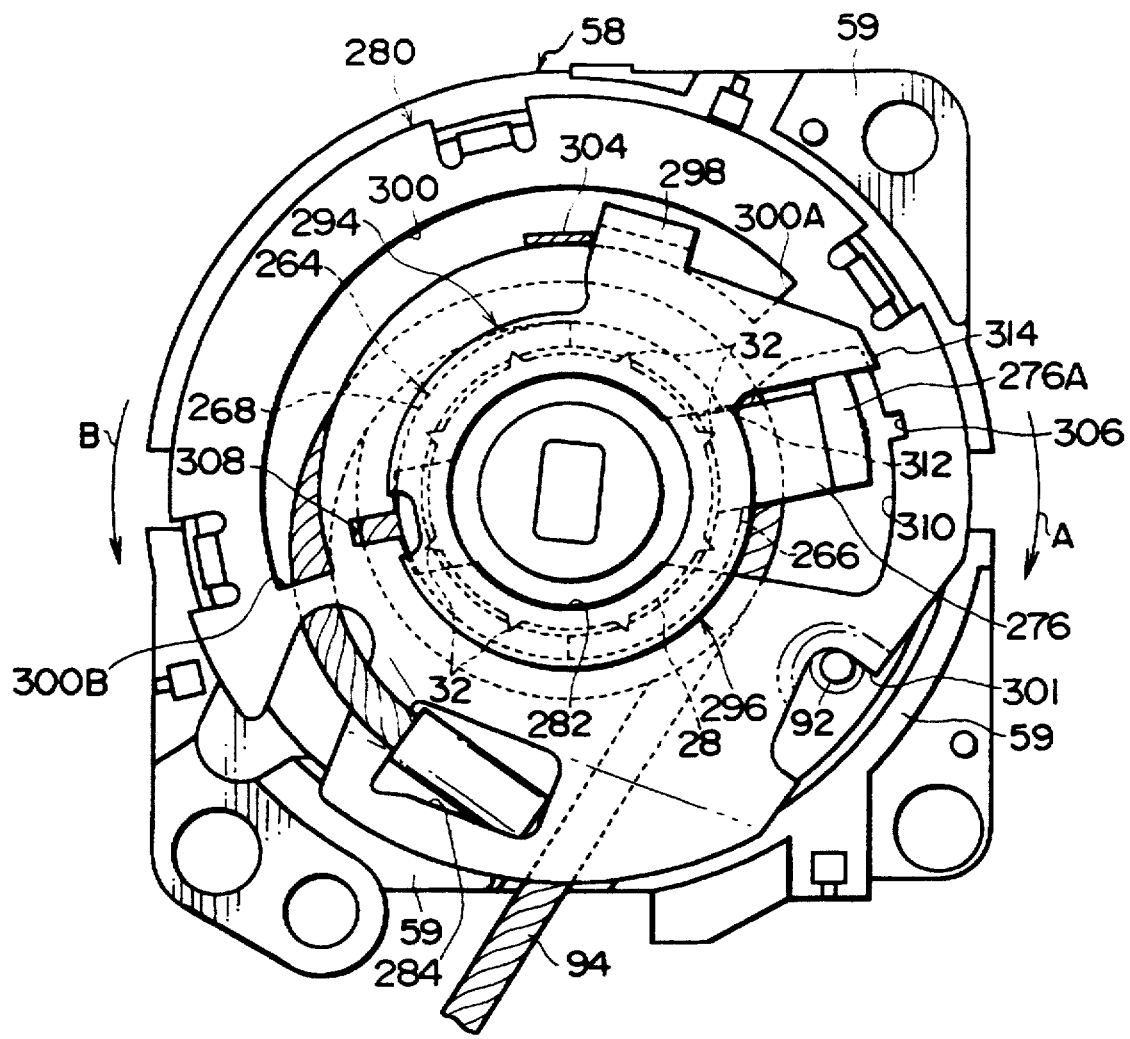
FIG. 18A is a side view of important parts showing that the drive plate has been rotated in the webbing winding direction following the state of FIG. 17A.

The drum 264 is made of softer metal (such as aluminum) than the locking shaft 40 and the pretension shaft 26. The drum 264 is arranged such that semi-annular clamping portions 266 and 268 face each other and constitute a generally cylindrical shape as a whole, as shown in FIG. 15 in detail. In this state, corresponding portions of the clamping portions 266 and 268 on both ends in the circumferential direction are connected to each other by a generally S-shaped compression portion 270 integrally molded with the clamping portions 266 and 268. Normally, as shown in FIG. 16A, while the drum 264 is arranged in the receiving portions 60 (see FIGS. 13 and 14), inner surfaces of the clamping portions 266 and 268 are spaced from the tip end portion of the protrusion 32 of the to-be-clamped portion 28 by a predetermined short distance. The drum 264 is separated from the pretension shaft 26 in the receiving portion 60. The compression portion 270 (see FIG. 15) is compression-deformed by the force applied when the clamping portions 266 and 268 approach to each other. As shown in FIG. 18A, therefore, when the clamping portions 266 and 268 approach to each other, they clamp the to-be-clamped portion 28. Since the drum 264 is made of metal softer than the pretension shaft 26, the protrusions 32 catch the inner surfaces of the clamping portions 266 and 268. As a result, the drum 264 and the pretension shaft portion 26 are rotated integrally with each other.

A generally flat plate-like engagement portion 276 from almost the central position in the circumferential direction to the outside in the diameter direction is protruded from an end face 266A on one end of the clamping portion 266 in the axial direction. A thicker portion 276B having a larger width than that of the engagement portion 276 is formed on the tip end portion of the engagement portion 276 for reinforcement. The proximal portion of the engagement portion 276 is to-be-broken portion 272. When force of a predetermined value or more in the circumferential direction of the drum 264 is applied to the tip end portion (thicker portion 276B) of the engagement portion 276 or the portion in its vicinity, the portion to be broken 272 is given bending moment and broken. When the portion to be broken 272 is broken, the engagement portion 276 is separated from the drum 264. On the other hand, even if force of the predetermined value or more in the circumferential direction of the drum 264 is applied to the portion in the vicinity of the proximal portion of the portion to be broken 272, the bending moment given to the portion to be broken 272 is smaller than that given to the tip end portion (thicker part 276B) or the portion in its vicinity. The portion to be broken 272 has predetermined strength so that the portion to be broken 272 is not broken by such a smaller bending moment.

A positioning protrusion 273 is formed on the further tip end portion of the engagement portion 276. A positioning protrusion 274 is formed on an end face 266 on one end of the clamping portion 268 in the axial direction. As shown in FIG. 16A, in assembling the webbing retractor 210, the positioning protrusions 273 and 274 are respectively received recesses 306, 308 of a drive plate 280 to be described later. By so doing, the drum 264 is positioned in the diameter direction relative to the cover drum 58.

Flanges 278 protruding outward are formed on other ends of the clamping portions 266 and 268 in the axial direction, thereby reinforcing the clamping portions 266 and 268.

The drive plate 280, which is in an almost disk shape, is arranged outside of the cover drum 58 (the opposite side to the support plate 14; left in FIGS. 13 and 14). Three portions on the outer periphery of the drive plate 280 are surrounded by the ribs 59 formed on the cover drum 58. Thus, the drive plate 280 is rotatable in a coaxial manner with the torsion bar 24. As shown in FIG. 16A, an insertion hole 282 into which the drum 264 is inserted, is formed at the center of the drive plate 280. When the drum 264 is inserted thereinto, the end face 266A of the clamping portion 266 and the end face 268A of the clamping portion 268 abut against the drive plate 280 to thereby position the drum 264 in the axial direction.

A generally fan-shaped recess 310 gradually wider toward the outside in the diameter direction is formed on the drive plate 280. The engagement portion 276 is received in the recess 310. In addition, the edge for the recess 310 is provided with a pressing edge 312 pressing the vicinity of the proximal portion of the engagement portion 276 (the vicinity of the portion to be broken 272) when the cover drum 58 is rotated relative to the drum 264 in the webbing winding direction.

Further, a recess 306 for receiving the positioning protrusion 273 is formed to communicate with the recess 310. A recess 308 for receiving the positioning protrusion 274 is formed in a position axially symmetrical to the recess 310 about the insertion hole 282.

A fixation part 284 to which a cylindrical member provided on one end of the wire 94 is fitted and fixed, is formed on the drive plate 280. The wire 94 which one end is fixed to the fixation part 284 is wound around the drum 264 a plurality of times (almost twice in this embodiment). The other end of the wire 94 is wound around the piston 88 (see FIG. 16A) within the cylinder 86 provided at the frame 12, and is fixed to the outside of the cylinder 86. If a sensor (not shown) detects that a deceleration of a predetermined value or more occurs to a vehicle on which the webbing retractor 210 is mounted, a gas generator (not shown) within a base cartridge 90 provided at the frame 12 operates and rapidly moves the piston 88 into the cylinder 86 as shown in FIGS. 17B, 18B, 19B and 20B. By the movement of the piston 88, the wire 94 is rapidly pulled and rotational force is applied to the drive plate 280.

As shown in FIGS. 12 and 16A, a shear pin 92 is protruded from the frame 12 through the cover drum 58. Since the shear pin 92 is engaged with an edge of cut-out portion 301 formed in the drive plate 280, the drive plate 280 is not rotated in the direction of winding the webbing 20 (the arrow A direction in FIG. 16A) in an ordinary running situation of the vehicle. However, when the wire 94 is rapidly pulled into the cylinder 86 and rotational force of the predetermined value or more is applied to the drive plate 80, the shear pin 92 is pressed and broken by the edge of the cut-out portion 301, thereby rotating the drive plate 280.

A generally annular stopper plate 296 is arranged outside of the drive plate 280. The stopper plate 296 is rotatably supported about the central axis J (see FIG. 12) of the torsion bar 24 in a coaxial manner with the torsion bar 24 by a positioning member (not shown). (For brevity, the stopper plate 296 and a cover plate 302 to be described later are not illustrated n FIGS. 13 and 14.) A move protrusion 298 extending outward in the diameter direction and having a tip end portion bent at approximately right angle toward the drive plate 280 side, is formed on the stopper plate 296. The tip end portion of the move protrusion 298 is located within a long opening 300 cut off to be of generally arc shape along the circumferential direction of the drive plate 280. By the relative rotation of the stopper plate 296 and the drive plate 280, the move protrusion 298 moves within the long opening 300. The central angle of the long opening 300 is set at about 150° and the stopper plate 296 and the drive plate 280 are rotated relatively to each other by about 150°.

Figure 16B:
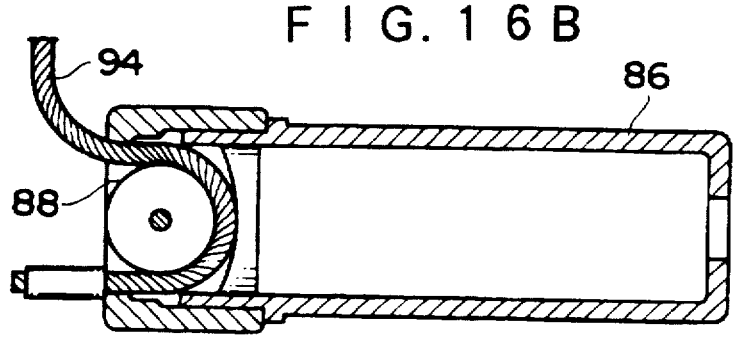
FIG. 16B is a cross-sectional view showing the cylinder of the webbing retractor in the second embodiment according to the present invention.

A pressing portion 314 protruding backward of the move protrusion 298 in the webbing winding direction (the arrow A direction side in FIG. 16) is formed at the stopper plate 296. The pressing portion 314 is generally wedge shaped and is formed such that the tip end portion is located in a position where the tip end portion can be in contact with the tip end portion of the engagement portion 276 from the side surface. As shown in FIG. 18A, while the move protrusion 298 abuts against a stopper protrusion 304 to be described later and the rotation of the stopper plate 296 in the webbing unwinding direction (the arrow B direction) is stopped. If the drum 264 is further rotated in the webbing unwinding direction in this state, the tip end portion of the engagement portion 276 is pressed by the tip end portion of the pressing portion 314. As a result, large bending moment as well as sharing force acts upon the portion to be broken 272 of the engagement portion 276, thereby breaking the engagement portion 276 at the portion to be broken 272.

A cover plate 302 is further arranged outside of the stopper plate 296 and fixed to the cover drum 58. The cover plate 302 allows a state in which the drum 264, the drive plate 280 and the stopper plate 296 are received in the recesses 60 and 62 of the cover drum 58, to be maintained.

The stopper protrusion 304 is protruded from the cover plate 302 toward the stopper plate 296. The stopper protrusion 304 has such a length as to abut against the move protrusion 298 and not to enter in the long opening 300. As shown in FIG. 16A, when a deceleration of a predetermined value or more does not occur to the webbing retractor 210, the move protrusion 298 of the stopper plate 296 is located lower right of the stopper protrusion 304 in FIG. 16A (in the direction of winding the webbing 20) and one end wall 300A of the long opening 300 of the drive plate 280 is located further lower right in FIG. 16A.

Figure 19A:
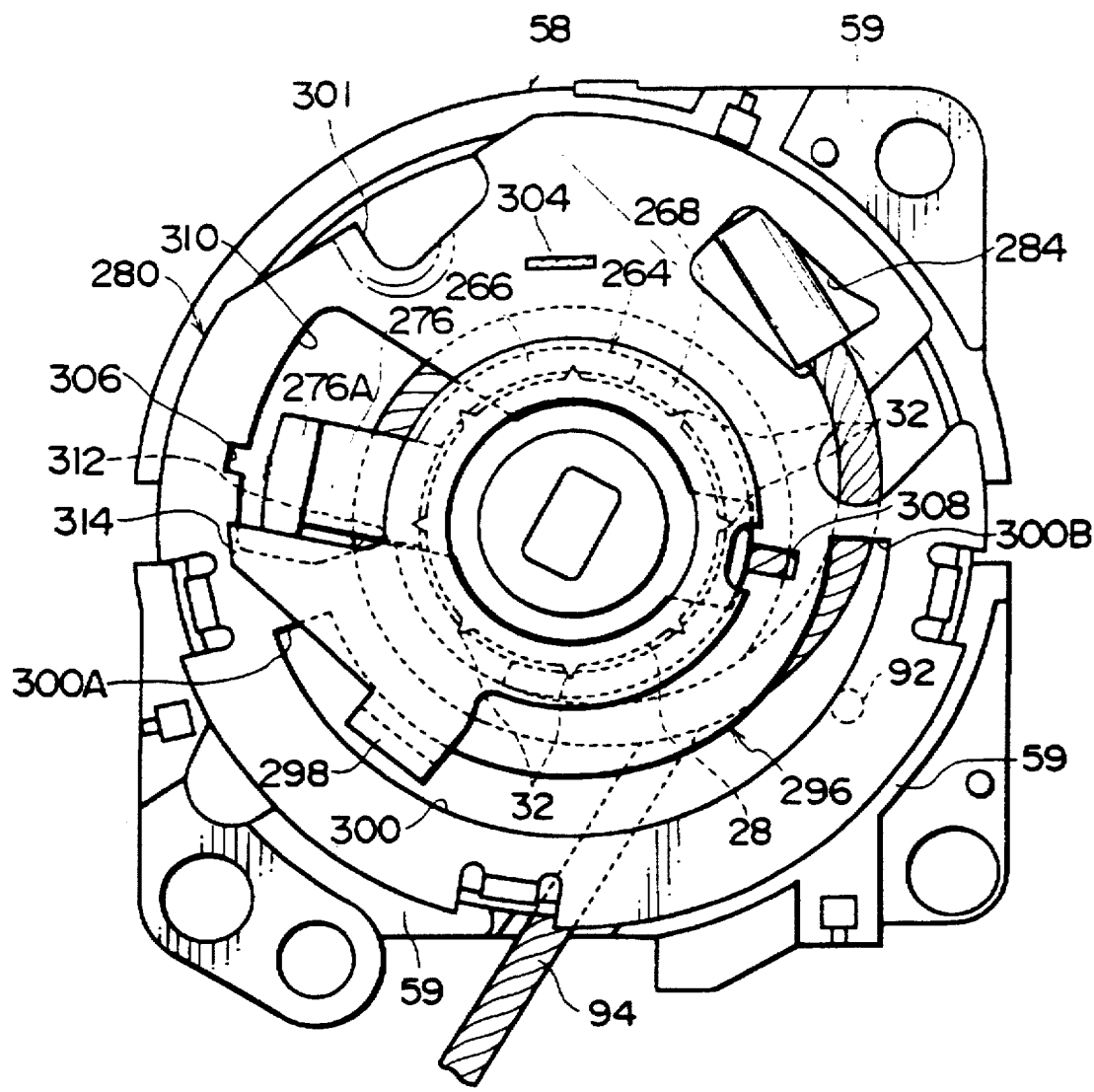
FIG. 19A is a side view of an important portion showing that the drive plate has been rotated in the webbing winding direction following the state of FIG. 18A.
Figure 19B:
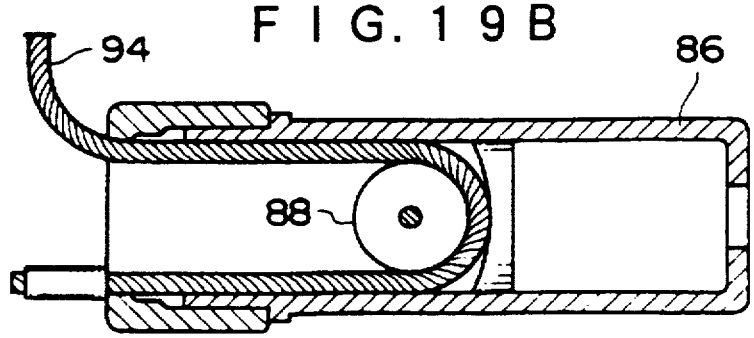
FIG. 19B is a cross-sectional view of the cylinder in this state.
Figure 20A:
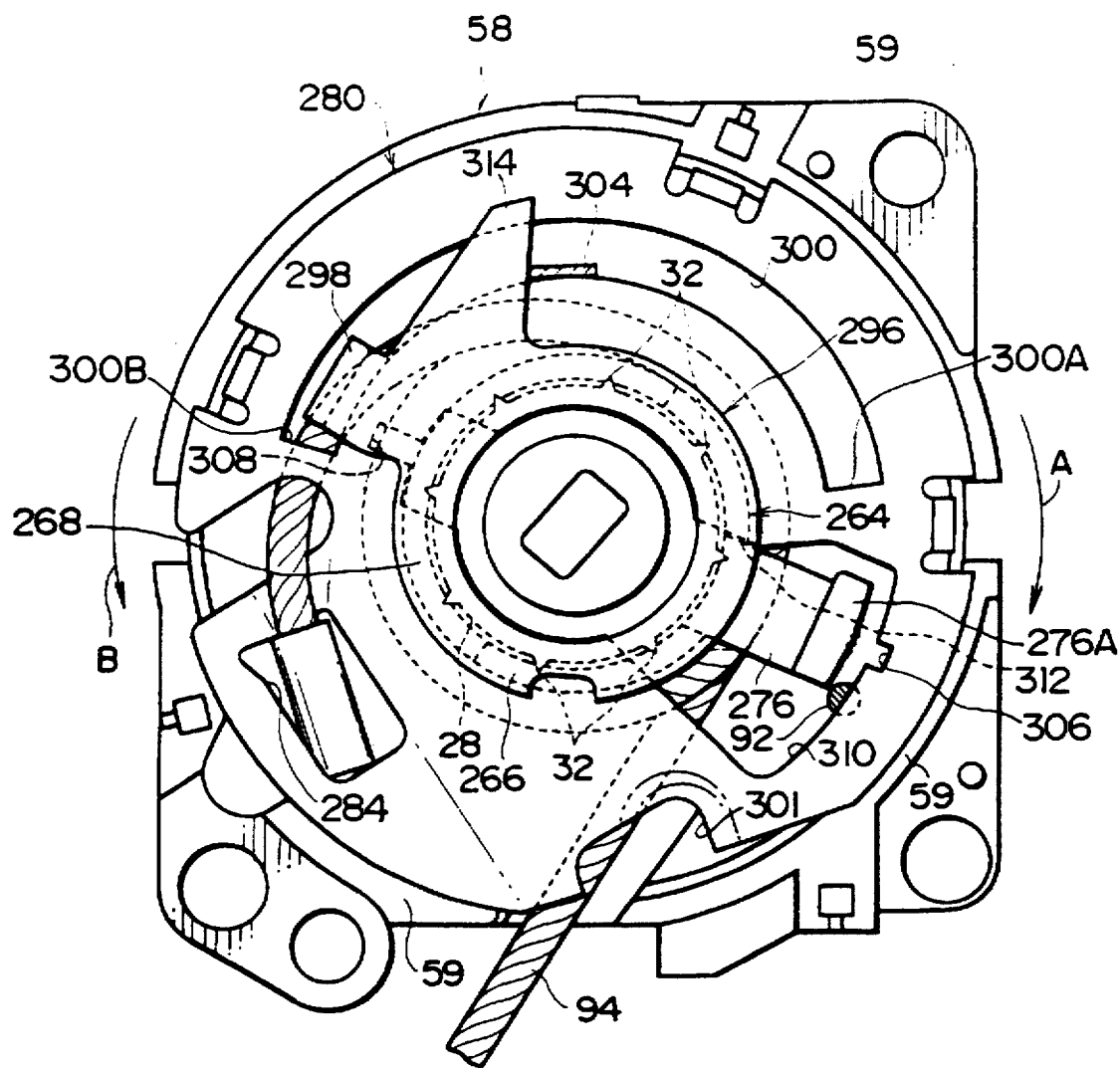
FIG. 20A is a side view of an important portion showing that the drive plate has been rotated in the webbing winding direction following the state of FIG. 19A.

When the wire 94 is pulled into the cylinder 86 and the drive plate 280 is rotated in the webbing winding direction (the arrow A direction in FIG. 16A), the pressing portion 312 presses the portion of the engagement portion 276 in the vicinity of the proximal portion thereof and therefore the drum 264 is rotated as well, as shown in FIG. 19A. When the drive plate 280 is further rotated, the pressing portion 314 abuts against the stopper protrusion 304 and the rotation of the drum 264 is stopped as shown in FIG. 20A. However, since the move protrusion 298 is received in the long opening 300, the stopper plate 296 is further rotated. When the wire 94 is pulled into the cylinder 86 by the piston 88 and the piston 88 reaches the base or bottom of the cylinder 86, the pulling of the wire 94 is finished and the rotation of the drive plate 280 is stopped.

As described above, in the early rotation stage, the drive plate 280 is rotated by about 360° along with the stopper plate 296. In the following stage, only the drive plate 280 is rotated by about 150°. In all, from the start to the end of the rotation, the drive plate 280 is rotated by about 510°. It is possible to change the speed of the relative rotation of the drive plate 280 and the stopper plate 296 and to change the rotational speed of the drive plate 280 by changing the length of the long opening 300. In addition, while the drive plate 280 is still being rotated, the move protrusion 298 can be located anywhere within the long opening 300. What is required is to rotate the drive plate 280 by about 510° from the start to the end of the rotation.

Next, description will be given to the operation and function of the webbing retractor 210 in the embodiment according to the present invention.

The operation and function in a normal running state of the vehicle, that is, if a deceleration of the vehicle on which the webbing retractor 210 is mounted does not reach the predetermined value, are the same as those of the webbing retractor 10 in the first embodiment according to the present invention. Therefore, no description will be given thereto.

When a deceleration of the predetermined value or more occurs to the vehicle, the inertial locking mechanism locks the rotation of the to-be-locked portion 50 in the direction of unwinding the webbing 20 (the arrow B direction in FIG. 16A) The rotation of the spool 18 rotated in the direction of unwinding the webbing 20 together with the torsion portion 22 is also locked, thereby making it impossible to further unwind the webbing 20.

Figure 17A:
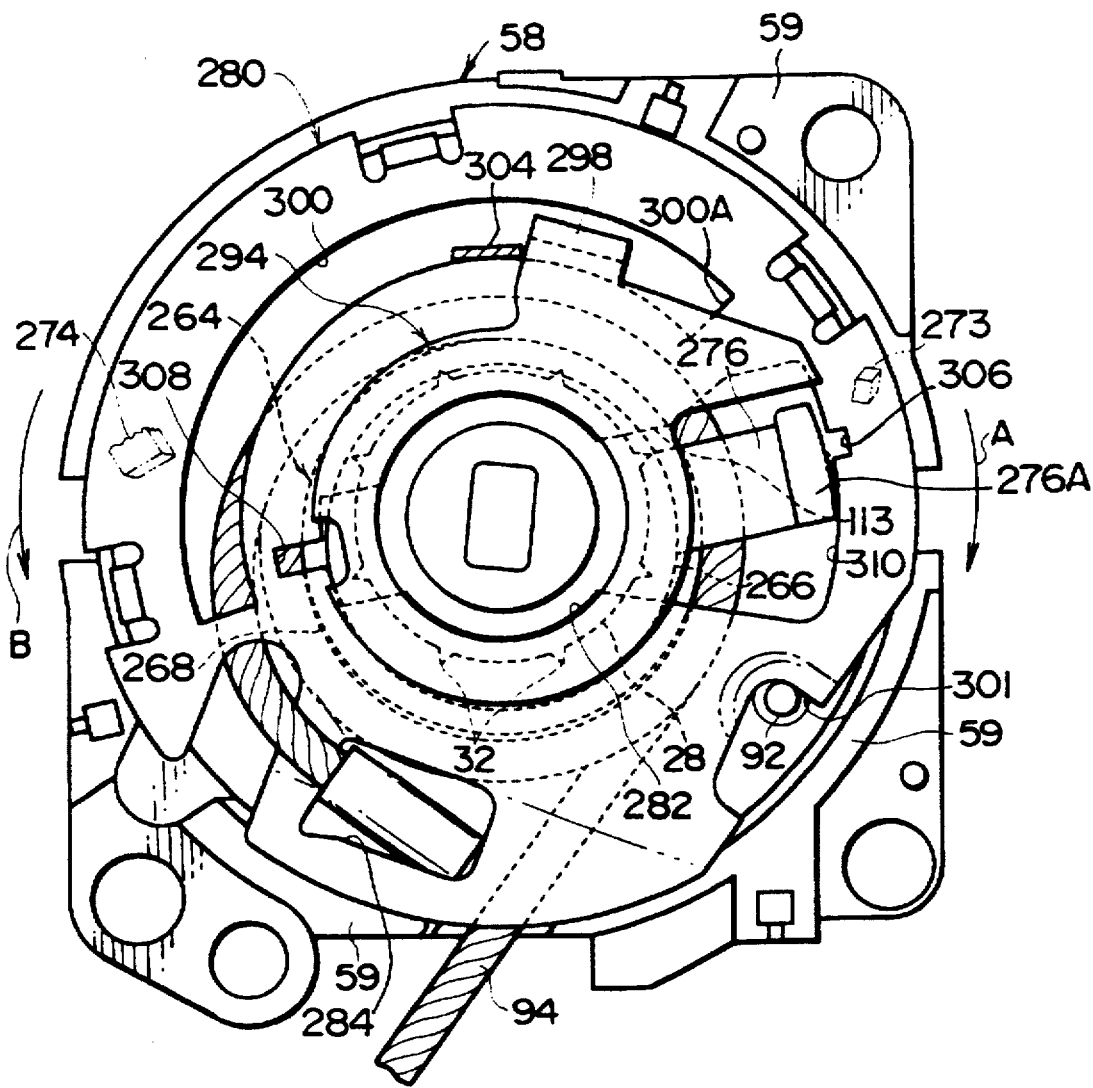
FIG. 17A is a side view of an important portion in a state where the drum has caught the pretension shaft following the state of FIG. 16A.
Figure 17B:
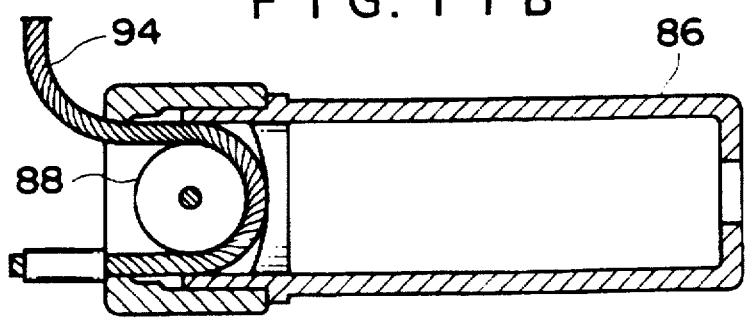
FIG. 17B is a cross-sectional view of the cylinder in this state.
Figure 18B:
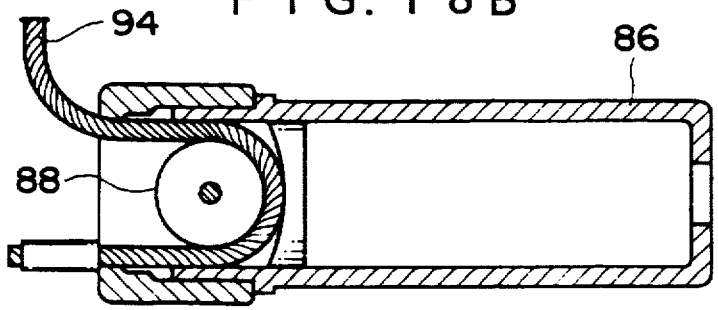
FIG. 18B is a cross-sectional view of the cylinder in this state.

Furthermore, since the gas generator operates and moves the piston 88 into the cylinder 86, the wire 94 is rapidly pulled into the cylinder 86 as shown in FIG. 17B. At this time, the drive plate 280 is not rotated since the rotation thereof is stopped by the shear pin 92. Since the positioning protrusions 273, 274 are received in the recesses 306, 308, the drum 264 is not rotated, as well. Due to this, the drum 264 around which the wire 94 is wound is rapidly tightened by the wire 94 and thereby the compression portion 270 (see FIG. 15) is compression-deformed. As shown in FIG. 17A, the clamping portions 266 and 268 approach to each other and clamp the to-be-clamped portion 28 of the pretension shaft portion 26. At this time, since the wire 94 is first wound around the upper portion of the drum 64 in FIG. 17A, the axial center of the drum 64 is shifted from that of the to-be-clamped portion 28 to the lower side in FIG. 17A. Then the upper portion ahead of the lower portion in FIG. 17A catches the to-be-clamped portion 28. By this movement, the positioning protrusions 273 and 274 also move to the lower side relative to the recesses 306 and 308 in FIG. 17A, thereby breaking the positioning protrusions 273 and 274. As shown in FIG. 18B, when the wire 94 is pulled into the cylinder 86 further, the lower portion of the drum 264 also catches the to-be-clamped portion 28 as shown in FIG. 18A. Thus, the drum 264 overall catches the to-be-clamed portion 28, thereby integrating the drum 264 with the pretension shaft 26. At this time, the axial center of the drum 264 again coincides with that of the to-be-clamped portion 28.

When the wire 94 is further pulled into the cylinder 86, the rotational force acts upon the drive plate 280 and the edge of the concave portion 301 presses and breaks the shear pin 92. As a result, as shown in FIG. 19A, the drive plate 280 is rotated in the webbing winding direction (the arrow A direction). Since the engagement portion 276 of the drum 264 is received in the recess 310 of the drive plate 280 and the pressing portion 312 presses a portion of the engagement portion 276 in the vicinity of the proximal portion thereof, the bending moment acting upon the portion to be broken 272 becomes quite small. Therefore, the portion to be broken 272 is substantially given only the shearing force. Since the portion to be broken 272 has such strength that it is not broken by the shearing force, the portion to be broken 272 is not broken. The drum 264 is rotated in the webbing unwinding direction integrally with the drive plate 280.

Figure 20B:
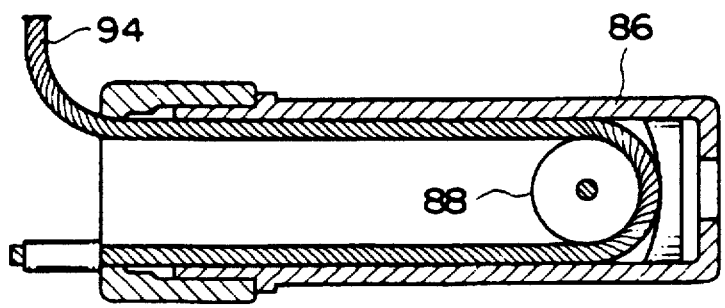
FIG. 20B is a cross-sectional view of the cylinder in this state.

The external gear 36 formed at the gear portion 30 of the pretension shaft portion 26 is engaged with the internal gear 38 on the inner periphery of the spool 18 and an inertial locking mechanism (not shown) does not lock the rotation of the locking shaft 40 in the direction of winding the webbing 20 (the arrow A direction). Due to this, by the rotation of the drum 264, the spool 18 is rotated in the direction of winding the webbing 20 (the arrow A direction) via the pretension shaft portion 26. As shown in FIG. 20B, when the piston 88 moves into the cylinder 86 and the wire 94 is pulled into the cylinder 86 to a maximum, as shown in FIG. 20A, the drive plate 80 is rotated by about 510° from the initial state to most tension the webbing 20. As a result, the webbing 20 is tightly fitted to the occupant.

Figure 21A:
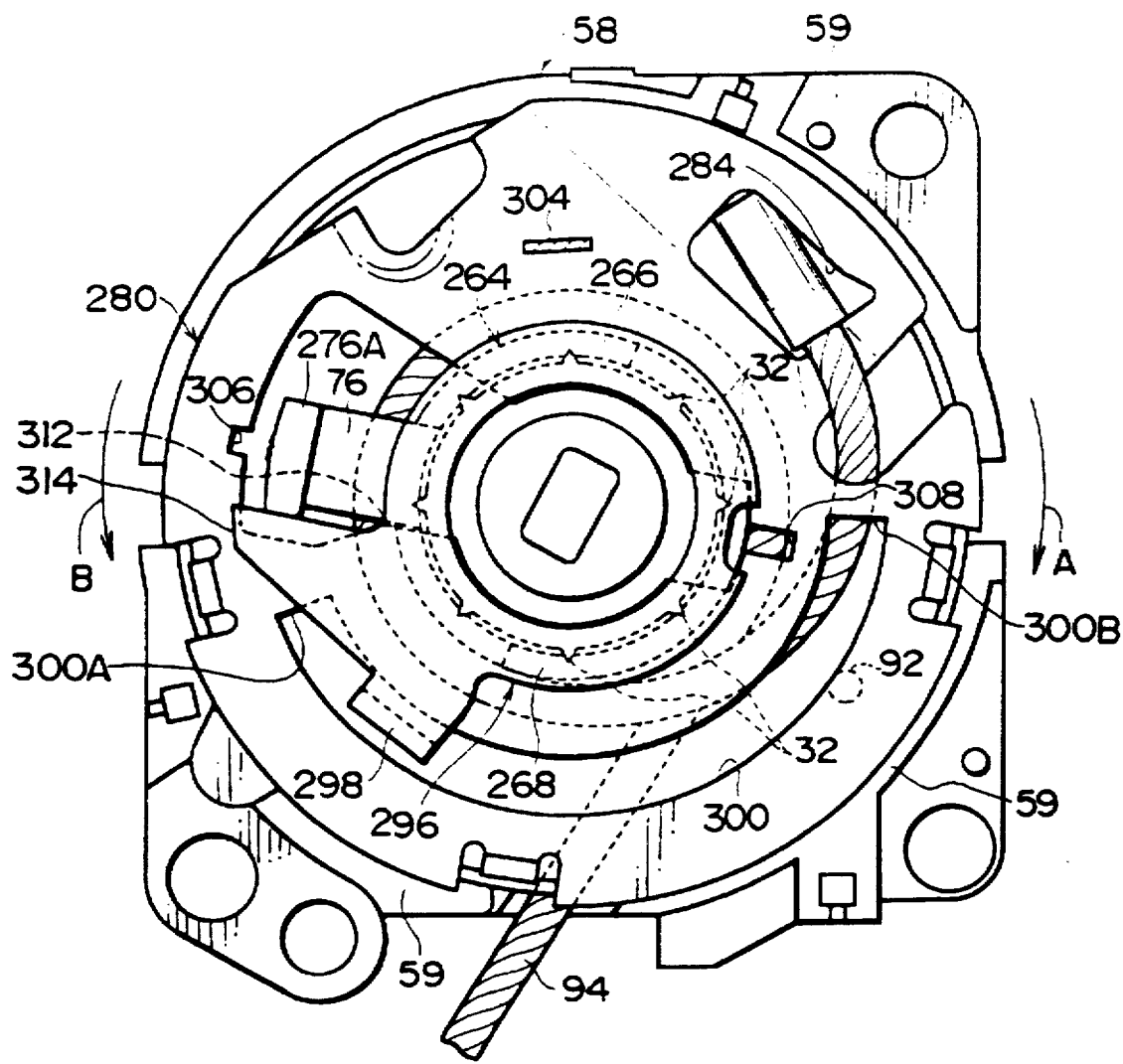
FIG. 21A is a side view of an important portion showing that the drive plate has been rotated in the webbing unwinding direction following the state of FIG. 20A.

Next, when unwinding force of the predetermined value or more acts upon the webbing 20 by the inertia force of the occupant to which the webbing 20 is fitted, the force acts upon the spool 18 as the rotational force in the direction of unwinding the webbing 20 (the arrow B direction in FIG. 21A). Here, since the inertial locking mechanism (not shown) locks the rotation of the locking shaft 40 in the direction of unwinding the webbing 20, the rotation of the torsion bar 24 which insertion portion 24B on the other end is inserted into the insertion hole 44 of the locking shaft 40 is locked on the other end side. Meanwhile, the insertion portion 24A on one end of the torsion bar 24 is inserted into the pretension shaft portion 26. The pretension shaft portion 26 is rotated integrally with the spool 18 by the engagement of the external gear 36 with the internal gear 38. The rotational force of the spool 18 is transmitted to the torsion bar 24 thorough the pretension shaft portion 26. The torsion bar 24 is plastically deformed and starts to be twisted. Thus, the function of the force limiter preventing tension of a predetermined value or more from acting upon the webbing 20 starts.

At this time, when the spool 18 is rotated around the locking shaft 40, the end face 54A of the partly cut-off ring 54 is pressed by a protrusion bar 56. Then, the ring 54 is rotated and starts moving toward the disc portion 48.

Figure 21B:
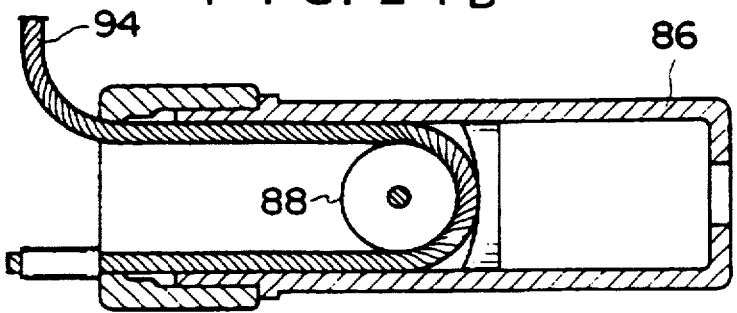
FIG. 21B is a cross-sectional view of the cylinder in this state.

Additionally, the drum 264 catching the to-be-clamped portion 28 of the pretension shaft portion 26 is also rotated in the direction of unwinding the webbing 20 (the arrow B direction in FIG. 20A). The drive plate 280 is therefore rotated in the direction of unwinding the webbing 20 and the wire 94 is pulled within the cylinder 86. Thereafter, as shown in FIG. 21B, the piston 88 moves left within the cylinder 86.

At this time, since the drum 264 presses the pressing portion 312 of the drive plate 280 in the vicinity of the proximal portion of the engagement portion 276 of the drum as shown in FIG. 21A, the drum 264 and the drive plate 280 are rotated in the direction of unwinding the webbing 20 (the arrow B direction) integrally with each other. Since the move protrusion 298 is received in the long opening 300, the drive plate 280 is rotated in the direction of unwinding the webbing 20 (the arrow B direction) relative to the stopper plate 296.

Figure 22A:
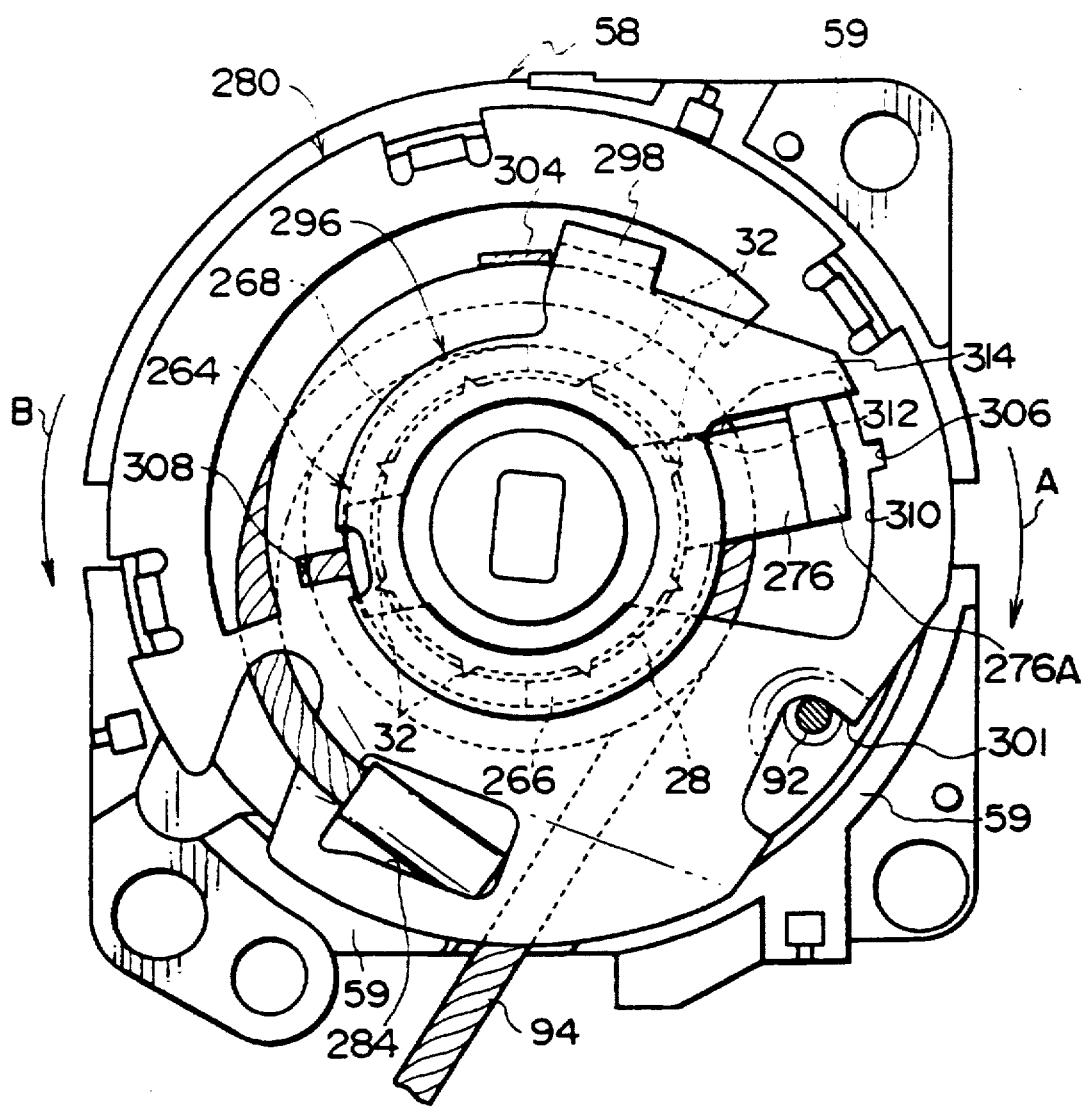
FIG. 22A is a side view of an important portion showing that the drive plate has been rotated in the webbing unwinding direction following the state of FIG. 21A.
Figure 22B:
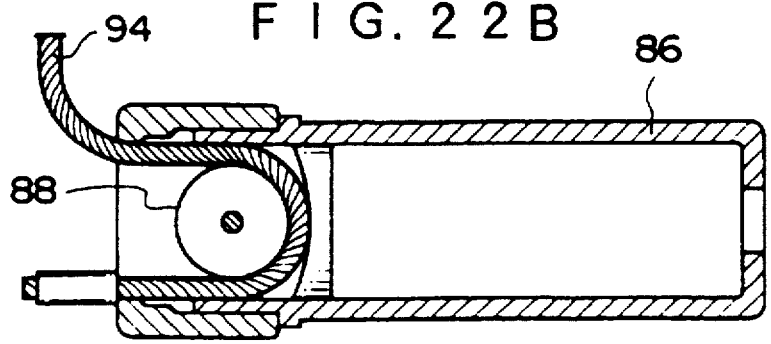
FIG. 22B is a cross-sectional view of the cylinder in this state.

As shown in FIG. 22A, when the drive plate 280 has been rotated to almost the same state as the initial state (which is shown in FIG. 16A) and the move protrusion 298 abuts against the stopper protrusion 304, the rotation of the stopper plate 296 is stopped. When the rotational force in the direction of unwinding the webbing 20 (the arrow B direction) acts upon the spool 18 in this state, the drum 264 is rotated in the direction of unwinding the webbing 20. Owing to this, the tip end portion of the engagement portion 276 is pressed by the tip end portion of the pressing portion 314. As a result, the large bending moment as well as the shearing force is applied to the portion to be broken 272 of the engagement portion 276, thereby breaking the engagement portion 276 at the to-be-broken portion 272 as shown in FIG. 23A.

Figure 24A:
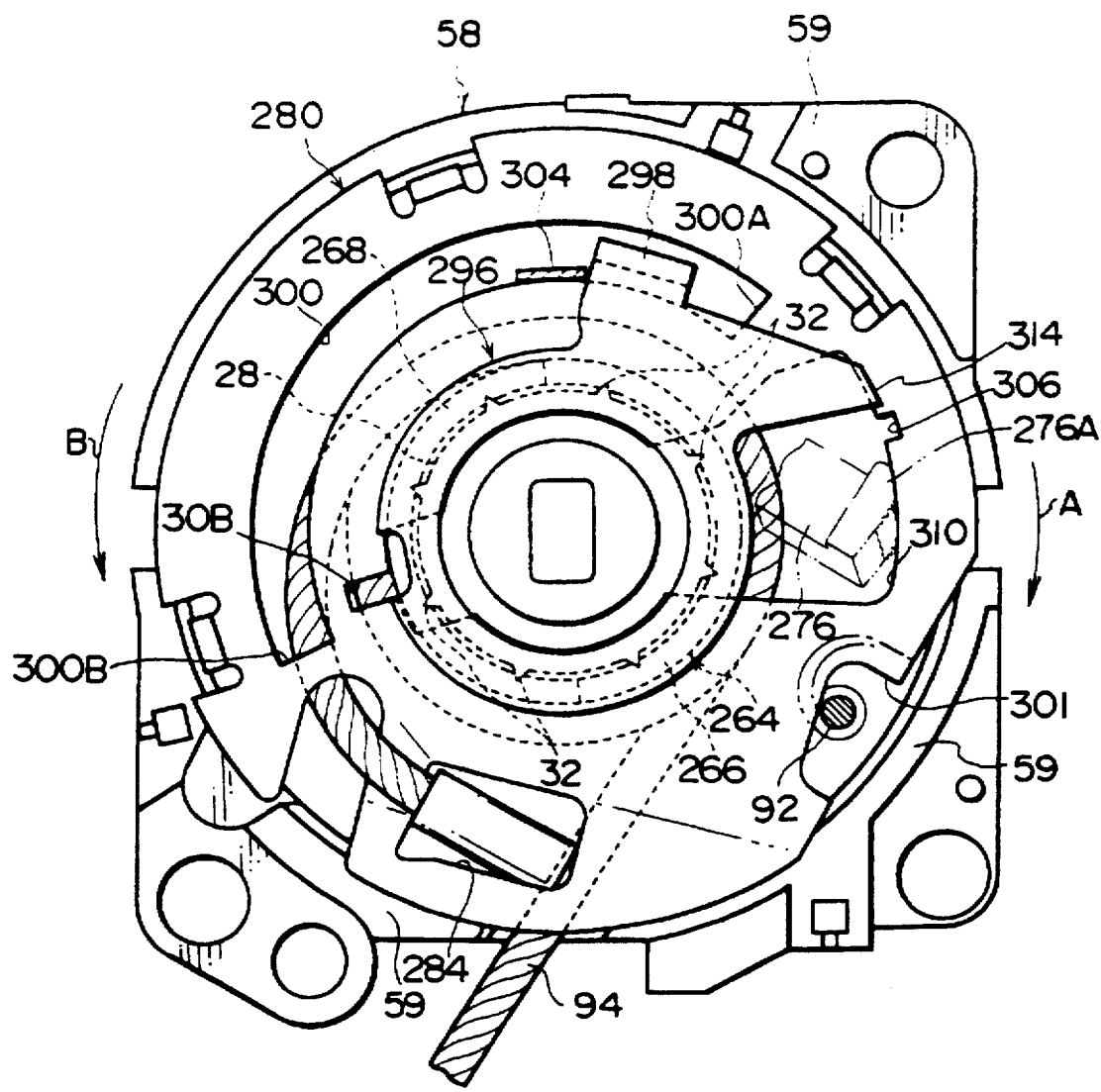
FIG. 24A is a side view of an important portion showing that the drive plate has been rotated in the webbing unwinding direction and the to-be-broken part of the engagement portion has been broken following the state of FIG. 23A.
Figure 24B:
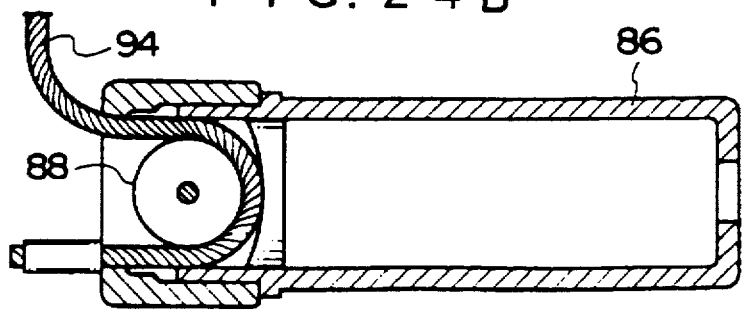
FIG. 24B is a cross-sectional view of the cylinder in this state.

Accordingly, as shown in FIG. 24A, the pretension shaft portion 26 is separated from the drive plate 280 and becomes rotable relative to the drive plate 280. The torsion bar 24 is therefore further twisted and force limiter function continues. The spool 18 is then rotated in the direction of unwinding the webbing 20. The torsion-deformation of the torsion bar 24 continues until the rotational force acting upon the pretension shaft portion 26 by the unwinding of the webbing 20 via the spool 18 is balanced with the torsion reaction of the torsion bar 24.

Figure 25A:
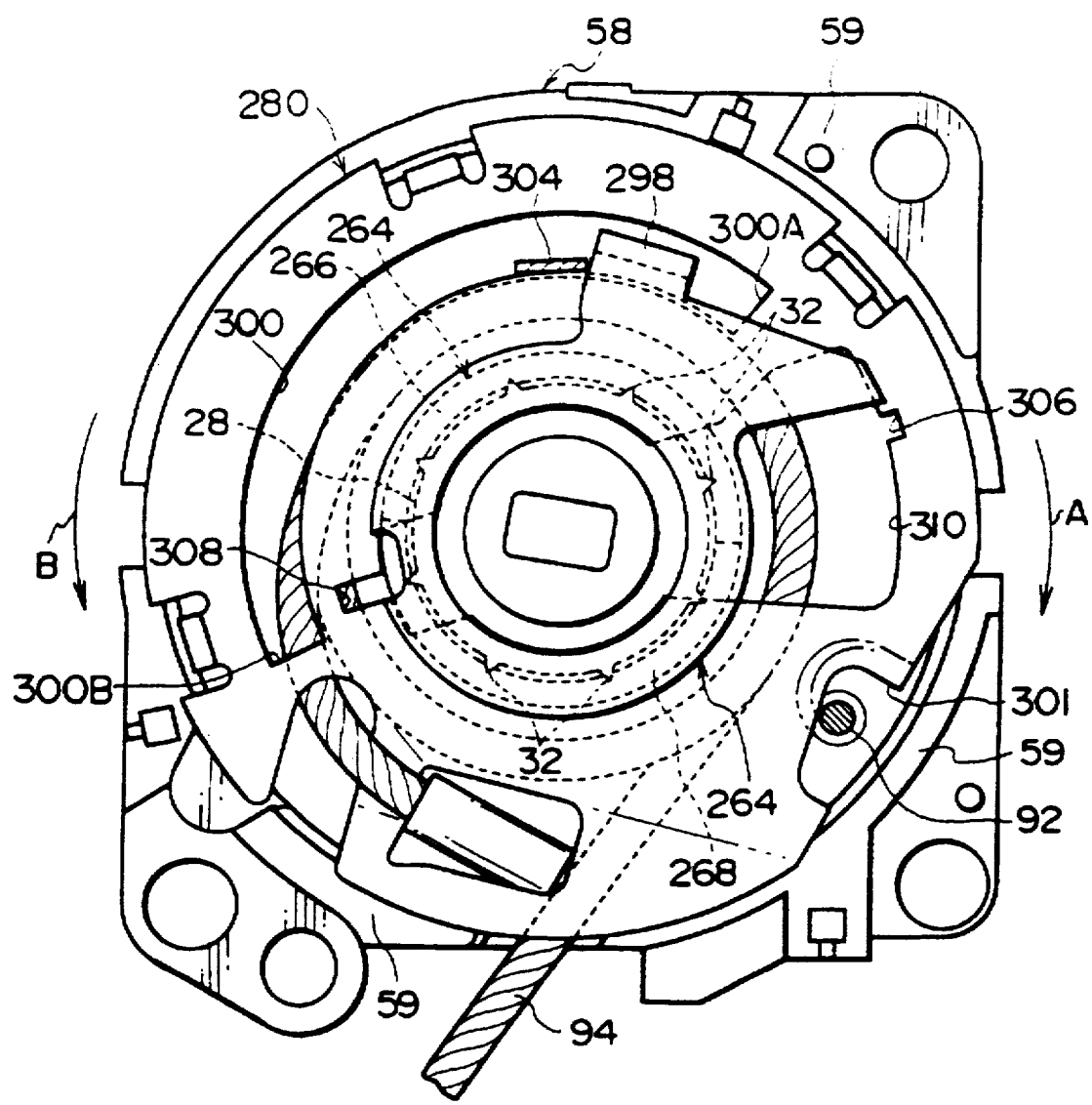
FIG. 25A is a side view of an important portion showing that the clamping portion of the drum and the pretension shaft have been rotated in the webbing unwinding direction following the state of FIG. 24A.
Figure 25B:
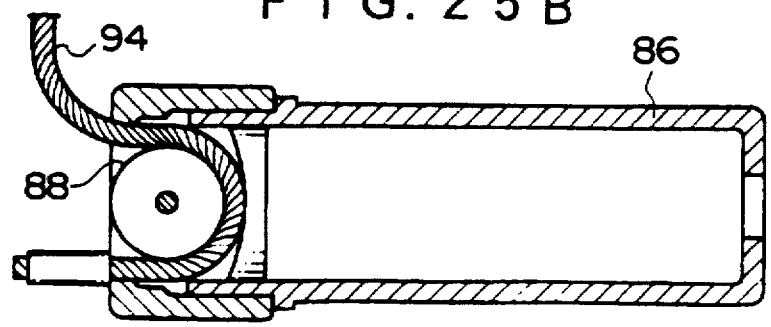
FIG. 25B is a cross-sectional view of the cylinder in this state.
Figure 26:
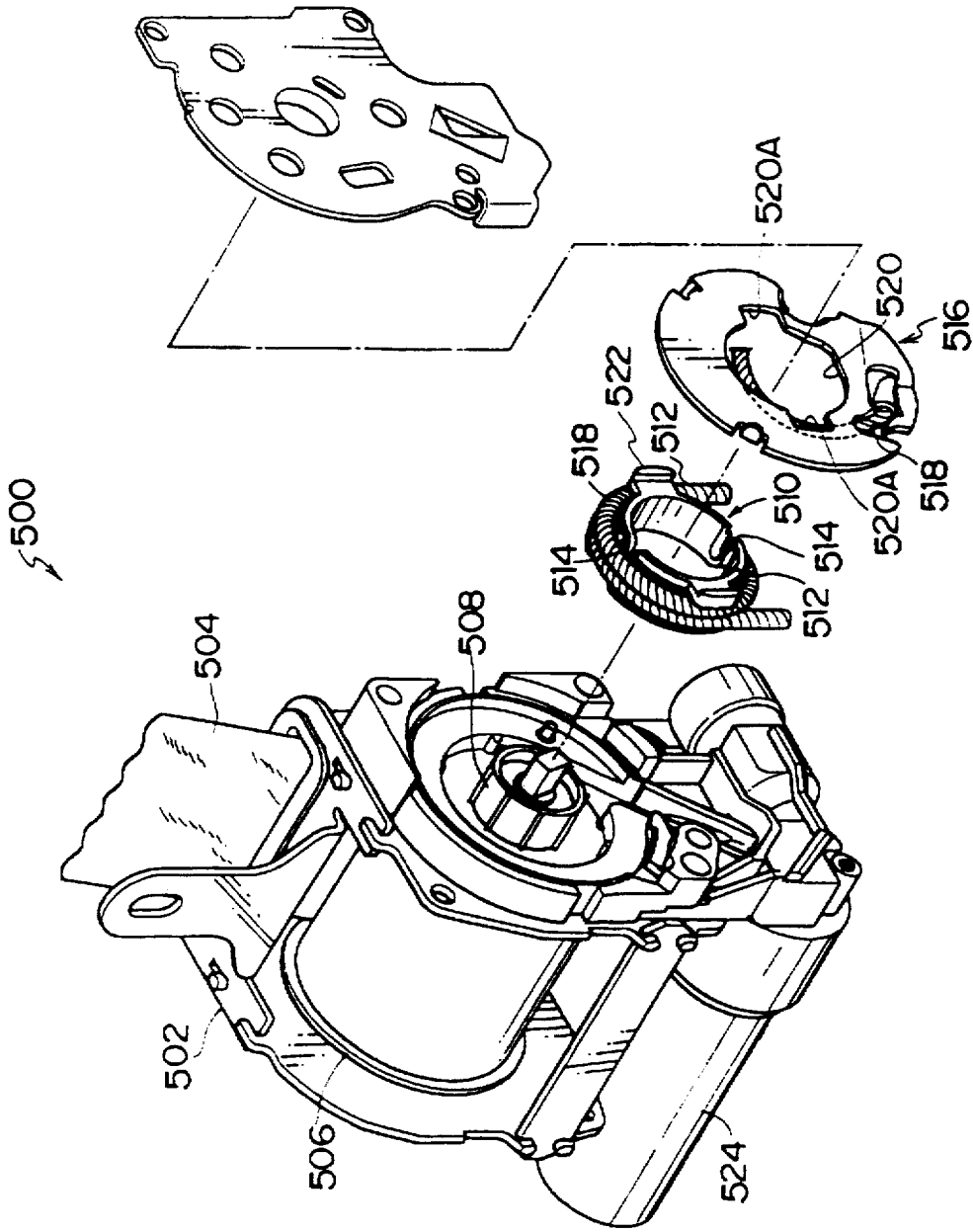
FIG. 26 is a perspectively exploded view of a conventional webbing retractor.

As shown in FIG. 25A, in response to the rotation angle by the torsion-deformation of the torsion bar 24, the clamping portion 266, 268, the pretension shaft 26 and the spool 18 (see FIGS. 12 through 14) are rotated, as well. The webbing 20 is thus unwound from the spool 18 and the force limiter function for preventing tension load applied to the webbing 20 from exceeding a predetermined value is carried out.

When the rotational force acting upon the spool 18 is large, the partly cut-off ring 54 which has moved toward the disc 48 abuts against the disc portion 48 and the ring 54 stops moving and rotation further as shown in FIG. 14. As a result, the rotation of the spool 18 is stopped, thereby preventing the excessive torsion-deformation and then the resultant cut-off of the torsion bar 24. In addition, since the rotation of the spool 18 can be stopped when the partially cut-off ring 54 is rotated and abuts against the disc portion 48, it is possible to change the speed of the relative rotation of the spool 18 to the locking shaft 40 by adjusting the initial position of the ring 54. As a result, it is possible to adjust the degree of unwinding the webbing 20 while the force limiter function by adjusting the degree of torsion of the torsion bar 24.

As described above, in the webbing retractor 210 in this embodiment, if the rotational force in the direction of unwinding the webbing 20 acts upon the spool 18 after the drum 264 has clamped the pretension shaft portion 26, the to-be-broken portion 272 of the drum 264 is broken and the pretension shaft portion 26 becomes rotatable relative to the pretensioner drive plate 280. It is therefore possible to carry out the force limiter function by sufficiently torsion-deforming the torsion bar 24.

Moreover, in the pretension operation, by pressing the portion the engagement portion 276 in the vicinity of the proximal portion thereof, the bending moment acting upon the portion to be broken 272 becomes small even if the pressing force is increased, thereby preventing the portion to be broken 272 from being broken. On the other hand, in the force limiter operation, by pressing the tip end portion of the engagement portion 276, it is possible that a large bending moment is applied to the portion to be broken 272 with small pressing force to thereby break the portion to be broken 272. Due to this, without reducing the tension to the webbing 20 in the pretensioner operation, only the tension load (or release load) in the force limiter operation can be reduced.

It is noted that in the pretension operation during a sudden or rapid deceleration, the position at which the drive plate 280, which has been rotated in the direction of winding the webbing 20, presses the drum 264 and the position at which the stopper plate 296 presses the engagement portion 276 while the force limiter operation is still carried out, should not be limited to those described above (that is, the portion of the engagement portion 276 positioned in the vicinity of the proximal portion thereof and that in the vicinity of the tip end portion thereof). They are determined by the relative relationship. Namely, if the position at which the drive plate 280 presses the drum 264 in the pretension operation is closer to the portion to be broken 272 than the position at which the stopper plate 296 presses the engagement portion 276 while the force limiter operation is still conducted, then the bending moment acting upon the portion to be broken 272 during the pretension operation can be made smaller than that acting thereupon while the force limiter operation is still conducted. For that reason, it is possible to set the strength of the portion to be broken 272 such that it is not broken by the bending moment applied in the pretension operation and is broken by the bending moment applied in the middle of the force limiter operation. Moreover, if these conditions are met, the protrusion direction of the engagement portion 276 is not limited to the outside in the direction of the diameter of the drum 64. The engagement portion 276 can be protruded, for example, in the axial direction of the drum 264.

What is claimed is:

1. A webbing retractor comprising:

a spool around which a webbing capable of being unwound therefrom is wound;

a pretensioner for rotating said spool in a webbing winding direction when a deceleration of a predetermined value or more is applied during a sudden deceleration of a vehicle;

an energy absorbing member put in a coupled state with said spool, rotated integrally with said spool and deformed by said spool to prevent an increase in tension of the webbing when rotational force in a webbing unwinding direction acts upon said spool after said spool has been rotated in said webbing winding direction by said pretensioner; and a cancelling portion applied with the rotational force in said webbing unwinding direction via said energy absorbing member when the energy absorbing member is deformed by the rotational force of said spool in said webbing unwinding direction, for cancelling the state in which rotation of said spool in the webbing unwinding direction is stopped by said pretensioner, wherein said pretensioner includes a rotation member rotated in said webbing winding direction when the deceleration of the predetermined value or more is applied to the vehicle; and a coupling member coupled to said rotation member to be coupled to said energy absorbing member for rotating said spool in said webbing winding direction when said rotation member is rotated in said webbing winding direction, and wherein said cancelling portion is provided at said coupling member.

2. A webbing retractor according to claim 1, wherein said cancelling portion is a portion to be broken through which said energy absorbing member and said pretensioner are separated from each other.

3. A webbing retractor according to claim 2, wherein said portion to be broken is provided at said pretensioner.

4. A webbing retractor according to claim 3, wherein
a rotation member rotated in said webbing winding direction when the deceleration of the predetermined value or more is applied to the vehicle; and
a coupling member coupled to said rotation member to be coupled to said energy absorbing member when said rotation member is rotated in said webbing winding direction, and wherein
said portion to be broken is provided at said coupling member.

5. A webbing retractor according to claim 4, wherein said portion to be broken is included in a protrusion provided on said coupling member.

6. A webbing retractor according to claim 5, further comprising breaking means for pressing and breaking said protrusion.

7. A webbing retractor according to claim 6, wherein said portion to be broken is in a portion of said protrusion in the vicinity of a proximal portion thereof.

8. A webbing retractor according to claim 7, wherein said breaking means is located to press a tip end portion of said protrusion.

9. A webbing retractor according to claim 1, wherein said energy absorbing member includes a torsion bar.

10. A webbing retractor according to claim 1, wherein said cancelling portion is an engagement portion provided on said coupling member.

11. A webbing retractor according to claim 10, wherein said engagement portion is coupled to said rotation member via a portion of said engagement portion in the vicinity of a proximal portion thereof when said rotation member is rotated in said webbing winding direction, and a tip end portion of said engagement portion is pressed by said rotation member, thereby preventing said pretensioner from stopping the rotation of said spool in the webbing unwinding direction.

12. A webbing retractor according to claim 1, wherein said energy absorbing member includes a torsion bar.

13. A webbing retractor comprising:
a spool around which a webbing capable of being unwound therefrom is wound;
a pretensioner for rotating said spool in a webbing winding direction when a deceleration of a predetermined value or more is applied during a sudden deceleration of a vehicle;
an energy absorbing member put in a coupled state with said spool, rotated integrally with said spool and deformed by said spool to prevent an increase in tension of the webbing when rotational force in a webbing unwinding direction acts upon said spool after said spool has been rotated in said webbing winding direction by said pretensioner; and a cancelling portion applied with the rotational force in said webbing unwinding direction via said energy absorbing member when the energy absorbing member is deformed by the rotational force of said spool in said webbing unwinding direction, for cancelling the state in which rotation of said spool in the webbing unwinding direction is stopped by said pretensioner, wherein said cancelling portion is a portion to be broken through which said energy absorbing member and said pretensioner are separated from.

14. A webbing retractor comprising:
a spool around which a webbing capable of being unwound therefrom is wound;
an energy absorbing member rotated integrally with said spool and deformed if torsion of a predetermined value or more is applied to said energy absorbing member;
a pretensioner comprising:
a rotation member rotated in said webbing winding direction when a deceleration of a predetermined value or more is applied to a vehicle during a rapid deceleration of the vehicle speed;
a coupling member rotatable integrally with said rotation member and coupled to said energy absorbing member when the deceleration of the predetermined value or more is applied to thereby rotate said energy absorbing member in said webbing winding direction; and
an engagement portion provided on said coupling member, said engagement portion being rotated in said webbing winding direction together with said coupling member when a portion of said engagement portion in a vicinity of a proximal portion thereof is pressed by said rotation member in accordance with the rotation of said rotation member in said webbing winding direction, and said engagement portion having a tip end portion of said engagement portion which is pressed when said coupling member is rotated in response to rotational force of said spool in said webbing unwinding direction via said energy absorbing member; and
a cancelling portion for cancelling the state in which the rotation of the spool in the webbing unwinding direction is stopped by said pretensioner when said energy absorbing member is deformed by torsion of the predetermined value or more due to the rotational force in said webbing unwinding direction and said tip end portion of said engagement portion is pressed by said rotation member.

15. A webbing retractor according to claim 14, wherein said cancelling portion is a portion to be broken having strength such that the portion to be broken is not broken when said vicinity of the proximal portion is pressed by said rotation member and is broken when said tip end portion is pressed by said rotation member.

16. A webbing retractor according to claim 15, wherein said energy absorbing member includes a torsion bar.

17. A webbing retractor comprising:
a spool around which a webbing capable of being unwound therefrom is wound;

a pretensioner for rotating said spool in a webbing winding direction when a deceleration of a predetermined value or more is applied during a sudden deceleration of a vehicle including a coupling member;

an energy absorbing member put in a coupled state with said spool, rotated integrally with said spool and deformed by said spool to prevent an increase in tension of the webbing when rotational force in a webbing unwinding direction acts upon said spool after said spool has been rotated in said webbing winding direction by said pretensioner; and a cancelling portion applied with the rotational force in said webbing unwinding direction via said energy absorbing member when the energy absorbing member is deformed by the rotational force of said spool in said webbing unwinding direction, for cancelling the state in which rotation of said spool in the webbing unwinding direction is stopped by said pretensioner, wherein said coupling member of said pretensioner is engageable with said energy absorbing member, and said cancelling portion is applied at said cancelling portion.

* * * * *